(12) United States Patent
Onitake et al.

(10) Patent No.: US 11,066,084 B2
(45) Date of Patent: Jul. 20, 2021

(54) RAILCAR AIR-CONDITIONING DUCT

(71) Applicant: KAWASAKI JUKOGYO KABUSHIKI KAISHA, Kobe (JP)

(72) Inventors: Yasuo Onitake, Akashi (JP); Noriyoshi Kohama, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 209 days.

(21) Appl. No.: 16/306,159

(22) PCT Filed: Mar. 14, 2017

(86) PCT No.: PCT/JP2017/010216
§ 371 (c)(1),
(2) Date: Nov. 30, 2018

(87) PCT Pub. No.: WO2017/208564
PCT Pub. Date: Dec. 7, 2017

(65) Prior Publication Data
US 2019/0315378 A1 Oct. 17, 2019

(30) Foreign Application Priority Data

Jun. 3, 2016 (JP) .............................. JP2016-111700

(51) Int. Cl.
*B61D 27/00* (2006.01)
*B60H 1/00* (2006.01)
*F24F 13/02* (2006.01)

(52) U.S. Cl.
CPC ..... *B61D 27/0018* (2013.01); *B60H 1/00564* (2013.01); *F24F 13/02* (2013.01)

(58) Field of Classification Search
CPC . B61D 27/0018; B60H 1/00564; F24F 13/02; F24F 13/068
USPC ............................................................ 454/83
See application file for complete search history.

(56) References Cited

U.S. PATENT DOCUMENTS

| 5,531,641 | A | * | 7/1996 | Aldrich | .............. | B60H 1/00364 454/100 |
| 2010/0154911 | A1 | * | 6/2010 | Yoskowitz | ................ | F15D 1/04 138/39 |
| 2010/0242513 | A1 | * | 9/2010 | Nishino | .............. | B60H 1/00371 62/244 |
| 2014/0370796 | A1 | * | 12/2014 | Sasaki | ...................... | F24F 13/02 454/108 |

FOREIGN PATENT DOCUMENTS

JP 2013-151224 A 8/2013
WO WO-2005073640 A1 * 8/2005 .............. F24F 13/24

* cited by examiner

*Primary Examiner* — Steven B McAllister
*Assistant Examiner* — Charles R Brawner
(74) *Attorney, Agent, or Firm* — Oliff PLC

(57) ABSTRACT

Provided is a railway vehicle air-conditioning duct that is capable of achieving a more uniform in-cabin temperature distribution through more appropriate volume distribution of conditioned air. A railway vehicle air-conditioning duct that supplies conditioned air generated by an air conditioner into a cabin and that extends in a vehicle length direction at a vehicle ceiling part has: a main duct; a chamber duct; a branch duct; and a guide part. The guide part is lower in height than the main duct, extends to a branch duct from the main duct or a partition wall in the main duct in a vehicle width direction, and supplies to the branch duct a portion of the conditioned air supplied to the main duct.

7 Claims, 12 Drawing Sheets

RAILCAR AIR-CONDITIONING DUCT

TECHNICAL FIELD

The present invention relates to a railcar air-conditioning duct.

BACKGROUND ART

In a railcar, an interior air-conditioning duct is provided in a ceiling along a longitudinal direction of a vehicle, namely, a vehicle length direction. Conditioned air that is temperature-controlled by an air conditioner is supplied to the air-conditioning duct, and the conditioned air is supplied from the air-conditioning duct to an interior in order to control temperature in the interior.

Preferably, a temperature distribution in the interior becomes uniform over an entire area in the vehicle length direction. To that end, it is important to properly control an airflow volume distribution of the conditioned air in the vehicle length direction. However, in the railcar and moreover, for example, a bus, a shape of a vehicle body is long in the vehicle length direction, and a structure of the air-conditioning duct also greatly depends on such a shape of the vehicle body, so that the proper airflow volume distribution of the conditioned air is hardly controlled. Under such circumstances, the applicant of the present invention has also already proposed a vehicle air-conditioning duct structure disclosed in Patent Document 1 in order to make a temperature distribution in the interior uniform.

PRIOR ART DOCUMENT

Patent Document

Patent Document 1: JP 2013-151224 A

SUMMARY OF THE INVENTION

Problems to be Solved by the Invention

The vehicle air-conditioning duct disclosed in Patent Document 1 aims to make the temperature distribution in the interior uniform by intentionally varying the airflow volume distribution of the conditioned air in the vehicle length direction.

An object of the present invention is to provide a railcar air-conditioning duct that can make the temperature distribution in the interior more uniform by more properly performing the airflow volume distribution of the conditioned air.

Means for Solving the Problems

In order to accomplish the above object, the present invention is configured as follows.

Namely, a railcar air-conditioning duct in an aspect of the present invention extending in a vehicle length direction in a ceiling portion of a vehicle, and through which conditioned air generated by a first air conditioner disposed at one end in the vehicle length direction and a second air conditioner disposed at the other end in the vehicle length direction is supplied to an interior, the railcar air-conditioning duct comprising:

a main duct configured to be disposed between the first air conditioner and the second air conditioner in the vehicle length direction, to be supplied the conditioned air from the first air conditioner and the second air conditioner, and to include a partition wall connecting a pair of diagonal positions at both ends of the main duct in the vehicle length direction and dividing the main duct into a first chamber and a second chamber;

a first chamber duct configured to be located on one end side in a vehicle width direction and to extend to the other end in the vehicle length direction, and to be supplied the conditioned air from the first chamber;

a second chamber duct configured to be located on the other end side in the vehicle width direction and to extend to the one end in the vehicle length direction, and to be supplied the conditioned air from the second chamber;

a first branch duct configured to be located on the one end side in the vehicle width direction, to be located on a first air conditioner side with respect to the first chamber duct in the vehicle length direction, and to communicate with the first chamber;

a second branch duct configured to be located on the other end side in the vehicle width direction, to be located on a second air conditioner side with respect to the second chamber duct in the vehicle length direction, and to communicate with the second chamber;

a first guide configured to be lower than a height of the main duct and to extend from the main duct or the partition wall to the first branch duct in the vehicle width direction, and to supply part of the conditioned air supplied from the first air conditioner to the first chamber into the first branch duct; and a second guide configured to be lower than the height of the main duct and to extend from the main duct or the partition wall to the second branch duct in the vehicle width direction, and to supply part of the conditioned air supplied from the second air conditioner to the second chamber into the second branch duct.

The railcar air-conditioning duct includes each guide that is lower than a height of the main duct and extends from a main duct or a partition wall to each branch duct in a vehicle width direction, so that the conditioned air supplied from each air conditioner to the main duct can efficiently be introduced to each branch duct by the guide. Thus, the airflow volume distribution of the conditioned air becomes more proper, and the temperature distribution in the interior can be made more uniform.

Effect of the Invention

According to the railcar air-conditioning duct of one aspect of the present invention, the airflow volume distribution of the conditioned air can properly be performed to make the temperature distribution in the interior more uniform.

EMBODIMENTS OF THE INVENTION

Figure 1:
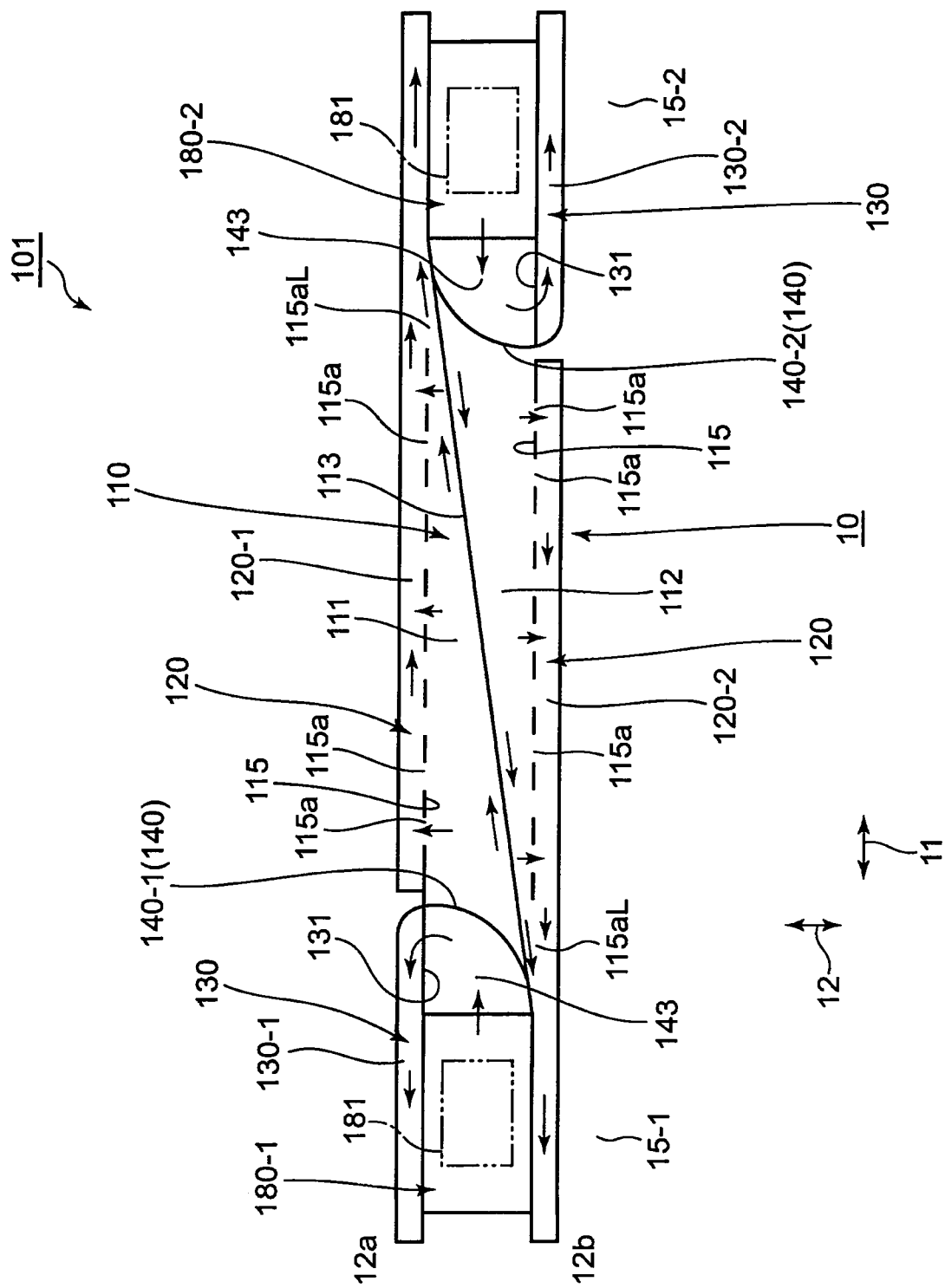
FIG. 1 is a view illustrating a schematic configuration of a railcar air-conditioning duct according to a first embodiment.

A railcar air-conditioning duct according to an exemplary embodiment will be described below with reference to the drawings. In each of the drawings, the same or similar component is indicated by the same reference numeral. Each of the drawings conceptually illustrates a structure, but a contraction scale relationship between structural components does not necessarily correspond to a real structure. Thus, for example, a chamber duct and a branch duct, which will be described below, are illustrated in the same row in a vehicle length direction. However, the chamber duct and the branch duct may be actually displaced from each other in a vehicle width direction. A height in the vehicle height direction of a main duct is illustrated at the same height over the vehicle length direction, but the height may be changed with a connection portion between the chamber duct and the branch duct as a boundary. The illustrated arrow simply indicates a rough direction (wind direction), and magnitude of the arrow does not indicate magnitude of force (wind force).

In order to avoid unnecessary redundancy of the following explanation to facilitate understanding of those skilled in the art, detailed description of a known matter and overlapping description of substantially the same configuration may be omitted in some cases. The contents of the following description and the accompanying drawings are not intended to limit the subject matter recited in the claims.

A schematic configuration of a railcar air-conditioning duct (hereinafter, simply referred to as an "air-conditioning duct") common to each embodiment will be described first. For convenience, an air-conditioning duct 101 of a first embodiment will be described as an example.

Figure 5:
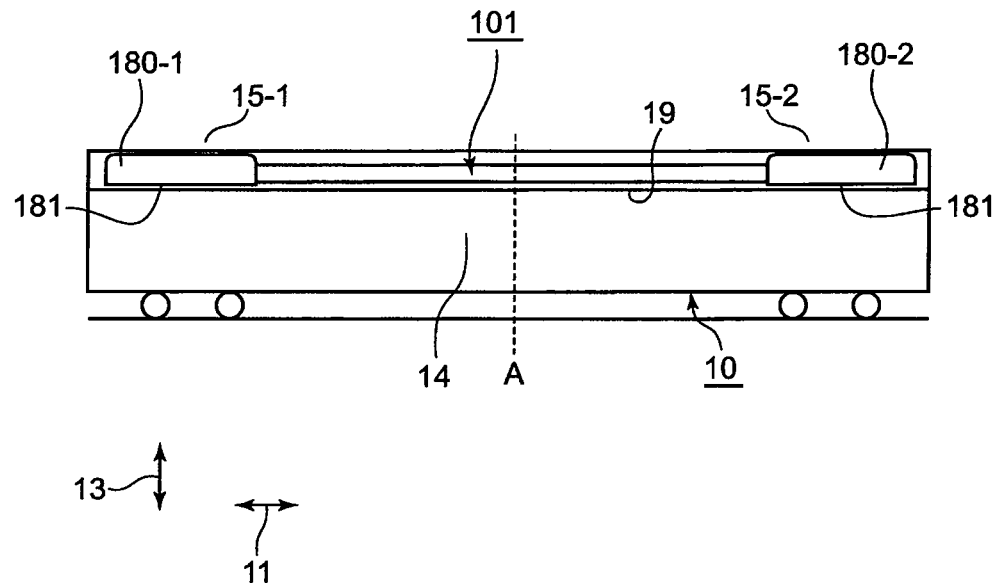
FIG. 5 is a view illustrating arrangement of the railcar air-conditioning duct in FIG. 1 in a railcar.

As illustrated in FIG. 5, the air-conditioning duct 101 is a conduit, which is installed on a back side of an interior ceiling 19 of a railcar 10 while extending in a vehicle length direction 11 that is a longitudinal direction of the railcar 10, and introduces the conditioned air generated by an air conditioner 180 to the interior. The air conditioner 180 is a device that controls temperature inside an interior 14, and the air conditioner 180 sucks air in the interior from a suction port 181, controls the air to a set temperature, and supplies the air to the air-conditioning duct 101 as the conditioned air. Even if two air conditioners 180 are installed for one railcar, the temperature in the interior 14 can be controlled by operating one of the air conditioners 180.

As illustrated in FIG. 1, for example, the air-conditioning duct 101 includes a main duct 110 that is located in a central portion in a vehicle width direction 12 and extends in the vehicle length direction 11, a chamber duct 120 located on both sides of the main duct 110 in the vehicle width direction 12, a branch duct 130 located adjacent to the chamber duct 120, and a guide 140, as basic components.

Each embodiment of the air-conditioning duct 101 having the above configuration will be described below.

First Embodiment

FIG. 1 illustrates a schematic configuration of an air-conditioning duct 101 according to a first embodiment. In the first embodiment, a first air conditioner 180-1 and a second air conditioner 180-2 are installed at both ends of the railcar 10 in the vehicle length direction 11. For convenience, in the first embodiment, the first air conditioner 180-1 is disposed at one end 15-1 in the vehicle length direction, corresponding to a first end side of the railcar 10, and the second air conditioner 180-2 is disposed at the other end 15-2 in the vehicle length direction, corresponding to a second end side of the railcar 10.

Figure 2:
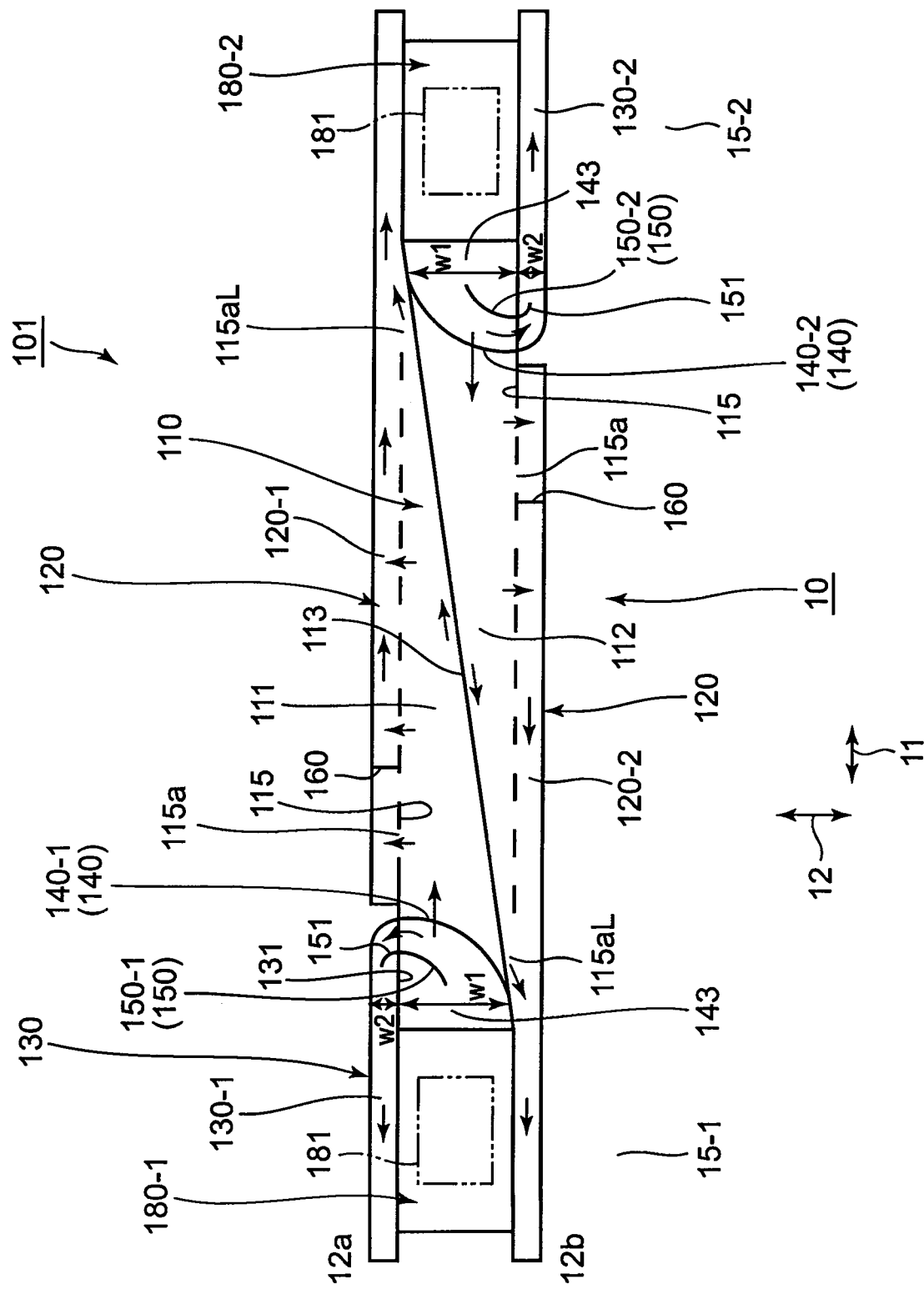
FIG. 2 is a view illustrating a modification of the railcar air-conditioning duct in FIG. 1.
Figure 12A:
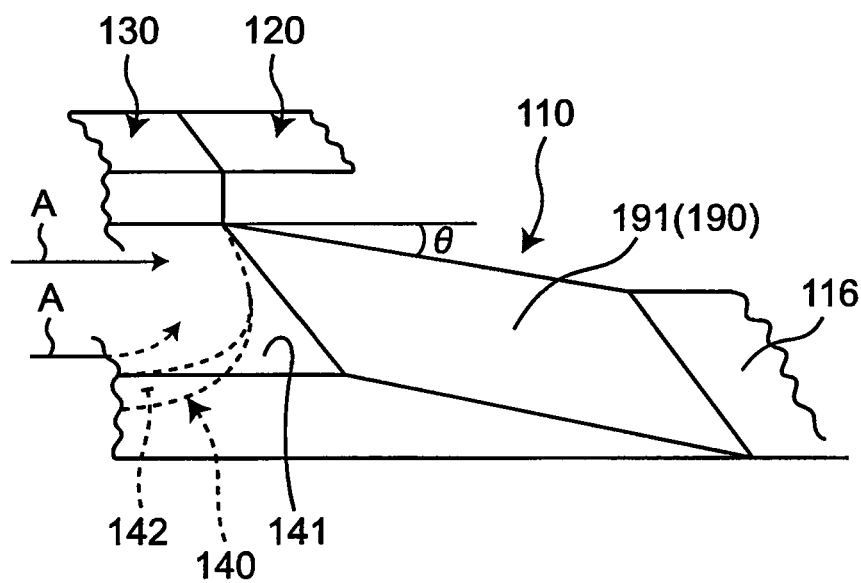
FIG. 12A is a perspective view illustrating an air flow noise suppressing member, which can be added to the guide of the railcar air-conditioning duct of each embodiment and extends from a ceiling of the guide to a main duct.
Figure 12B:
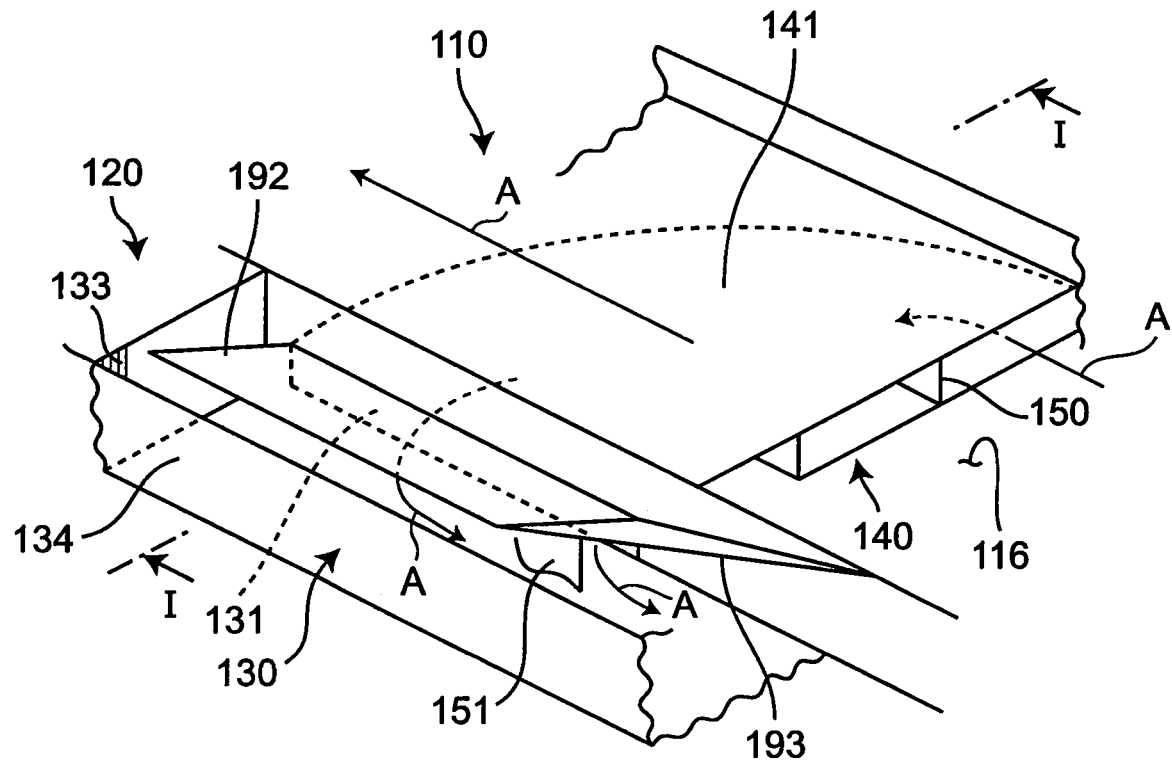
FIG. 12B is a perspective view illustrating an air flow noise suppressing member, which can be added to a branch duct of the railcar air-conditioning duct of each embodiment and extends to an inside of the branch duct.
Figure 12C:
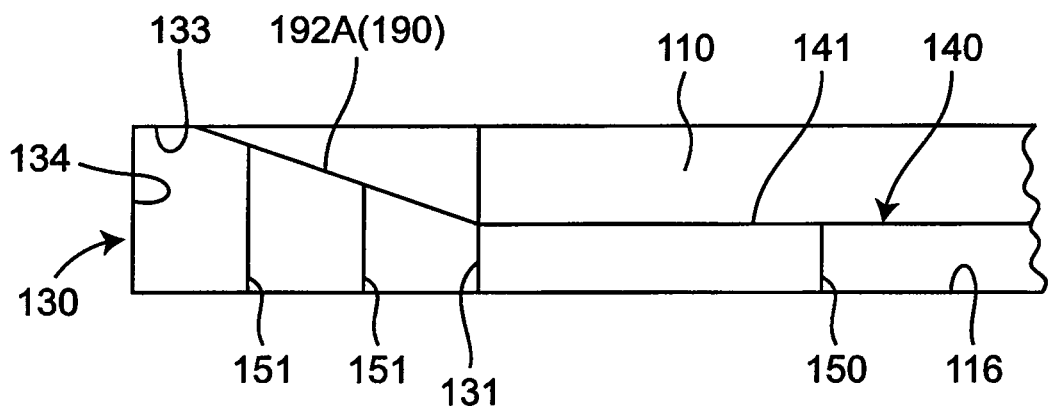
FIG. 12C is a perspective view illustrating an air flow noise suppressing member, which can be added to the branch duct of the railcar air-conditioning duct of each embodiment and extends in the branch duct.

As illustrated in FIG. 1, the air-conditioning duct 101 includes one main duct 110, two chamber ducts 120 (a first chamber duct 120-1, a second chamber duct 120-2), two branch ducts 130 (a first branch duct 130-1, a second branch duct 130-2), and two guides 140 (a first guide 140-1 and a second guide 140-2), as basic components. The air-conditioning duct 101 can also include a wind direction plate 150 and a partition plate 160 as illustrated in FIG. 2, and furthermore, include an air flow noise suppressing member 190 as illustrated in FIGS. 12A, 12B, and 12C.

These components will sequentially be described below.
The main duct 110 will be described.

In the first embodiment, the main duct 110 is a duct located at a central portion in the vehicle width direction 12 of the railcar 10 and a central portion 16 in the vehicle length direction 11. In the first embodiment, the main duct 110 is a duct located between the first air conditioner 180-1 and the second air conditioner 180-2 in the vehicle length direction 11. In the first embodiment, for example, the main duct 110 has a width dimension of about ⅓ of a vehicle width and a length dimension of about ⅗ of a vehicle length.

The main duct 110 includes a partition wall 113 that divides the main duct 110 into a first chamber 111 and a second chamber 112. The partition wall 113 is a plate member that connects a set of diagonal positions at both ends of the main duct 110 in the vehicle length direction 11 while extending in the duct. In the first embodiment, the partition wall 113 extends linearly as illustrated FIGS. 1 and 2. However, the partition wall 113 is not limited to the linear shape, and may have any shape that connects the set of diagonal positions at both the ends of the duct. For example, the partition wall 113 may have a stair shape.

The first air conditioner 180-1 and the second air conditioner 180-2 have one or a plurality of openings through which the conditioned air is supplied from the first air conditioner 180-1 and the second air conditioner 180-2 to the first chamber 111 and the second chamber 112, respectively.

Figure 6:
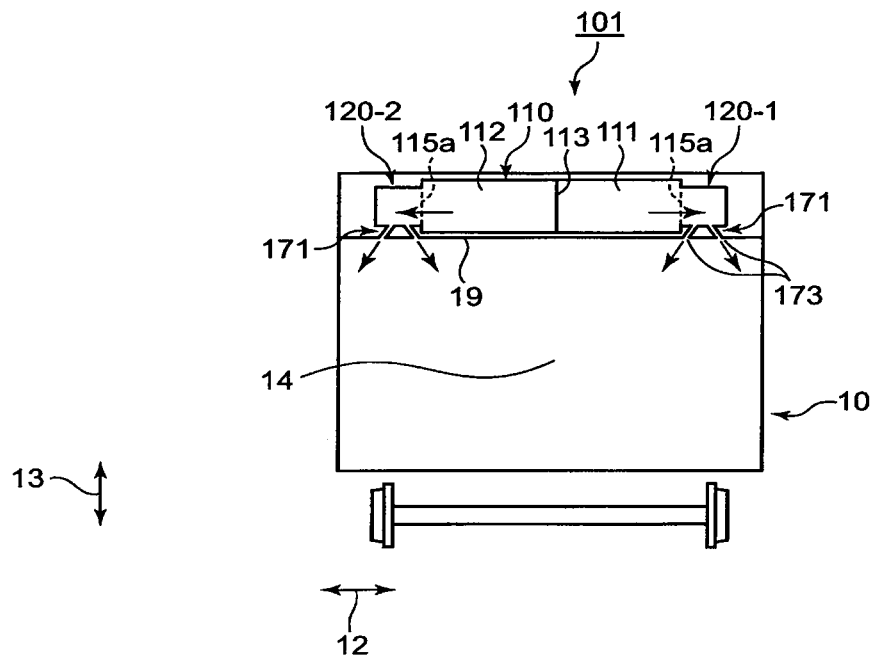
FIG. 6 is a cross-sectional view of a portion A in FIG. 5.

The main duct 110 includes sidewalls 115 extending along the vehicle length direction 11 on both sides in the vehicle width direction 12. The sidewalls 115 are boundary walls between the chamber duct 120 and the main duct 110, and have a plurality of outlets 115a at appropriate intervals in the vehicle length direction 11 as illustrated in FIG. 1. As illustrated in FIG. 6, the outlet 115a communicates the main duct 110 with each of the chamber ducts 120.

The chamber duct 120 will be described below.

As illustrated in FIGS. 1 and 6, the chamber ducts 120 are ducts positioned on both left and right sides of the main duct 110 in the vehicle width direction 12, and include a first chamber duct 120-1 and a second chamber duct 120-2.

The first chamber duct 120-1 is located on one end side 12a in the vehicle width direction, extends to the other end 15-2 in the vehicle length direction with an end adjacent to the first branch duct 130-1 as a starting point, and communicates with the first chamber 111 of the main duct 110 through the outlets 115a of the sidewall 115.

The second chamber duct 120-2 is located on the other end side 12b in the vehicle width direction, extends to one end 15-1 in the vehicle length direction with an end adjacent to the second branch duct 130-2 as a starting point, and communicates with the second chamber 112 of the main duct 110 through the outlets 115a of the sidewall 115.

Thus, each chamber duct 120 is a duct through which the conditioned air is supplied from the main duct 110 to the interior 14. That is, the chamber duct 120 has a function of supplying the conditioned air to the interior 14 while decreasing a wind speed of the conditioned air having a strong flow in the vehicle length direction 11 in the main duct 110. In the first embodiment, for example, each chamber duct 120 has the width dimension of about ¼ of the width of the main duct 110 in the vehicle width direction 12.

At this point, in the sidewalls 115 of the main duct 110, outlets 115aL are provided as the outlet 115a at positions corresponding to both ends in the vehicle length direction 11 of the partition wall 113 of the main duct 110. Thus, the conditioned air flowing through each of the first chamber 111 and the second chamber 112 of the main duct 110 is introduced to the chamber duct 120 through the outlet 115aL in a most downstream portion.

By adopting such a structure, the conditioned air can sufficiently be supplied from the first chamber 111 onto the other end 15-2 side in the vehicle length direction of the first chamber duct 120-1. Similarly, the conditioned air can sufficiently be supplied from the second chamber 112 onto the one end 15-1 side in the vehicle length direction of the second chamber duct 120-2.

As illustrated in FIG. 6, each chamber duct 120 includes a plurality of diffusers 171 in a lower portion of the chamber duct 120 in a vehicle height direction 13. The diffuser 171 is provided in the interior ceiling 19, and supplies the conditioned air supplied from the main duct 110 to each chamber duct 120 to the interior 14. The diffuser 171 includes a supply port 173. The supply port 173 is oriented so as to supply the conditioned air to the interior 14 in two directions of a window side and a central side of the railcar 10 in the vehicle width direction 12.

The branch duct 130 will be described below.

The branch duct 130 is a duct that is separated from the chamber duct 120 in the vehicle length direction 11 and located adjacent to the chamber duct 120, and includes a first branch duct 130-1 and a second branch duct 130-2.

In the first embodiment, the first branch duct 130-1 is located on the one end side 12a in the vehicle width direction, is located on the first air conditioner 180-1 side with respect to the first chamber duct 120-1 in the vehicle length direction 11 (the one end 15-1 side in the vehicle length direction), and communicates with the first chamber 111 of the main duct 110 through an opening 131 provided in the sidewall 115 of the main duct 110.

In the first embodiment, the second branch duct 130-2 is located on the other end side 12b in the vehicle width direction, is located on the second air conditioner 180-2 side with respect to the second chamber duct 120-2 in the vehicle length direction 11 (the other end 15-2 side in the vehicle length direction), and communicates with the second chamber 112 of the main duct 110 through the opening 131 provided in the sidewall 115 of the main duct 110.

Thus, each branch duct 130 is a duct through which the conditioned air is supplied from the main duct 110 to the interior 14, in particular to the interior 14 on the one end 15-1 side in the vehicle length direction and the other end 15-2 side in the vehicle length direction (also collectively referred to as a vehicle end 15). Each branch duct 130 also includes the plurality of diffusers 171 described above.

With respect to the chamber duct 120 and the branch duct 130 described above, in the first embodiment, as illustrated in FIG. 1, on the one end side 12a in the vehicle width direction 11, the first branch duct 130-1 is disposed on the first air conditioner 180-1 side (the one end 15-1 side in the vehicle length direction), and the first chamber duct 120-1 extends onto the second air conditioner 180-2 side (the other end 15-2 side in the vehicle length direction). On the other end side 12b in the vehicle width direction, the second branch duct 130-2 is disposed on the second air conditioner 180-2 side in the vehicle length direction 11, and the second chamber duct 120-2 extends onto the first air conditioner 180-1 side.

Figure 3:
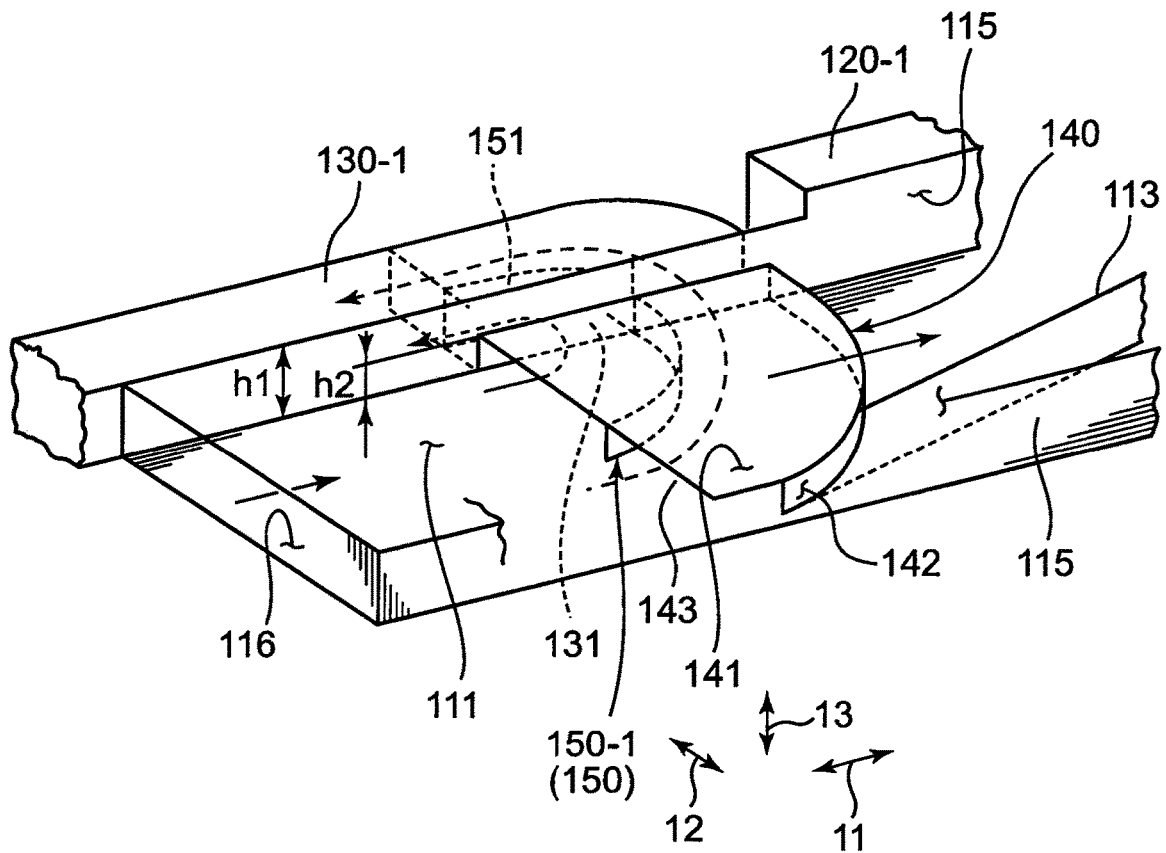
FIG. 3 is a perspective view illustrating a schematic configuration in a vicinity of a guide of the railcar air-conditioning duct in FIG. 1, and is a perspective view in a mode in which the guide further includes a wind direction plate.

The guide 140 will be described below with reference to FIG. 3. FIG. 3 illustrates a schematic configuration of the vicinity of the first branch duct 130-1 in FIG. 1.

Figure 11:
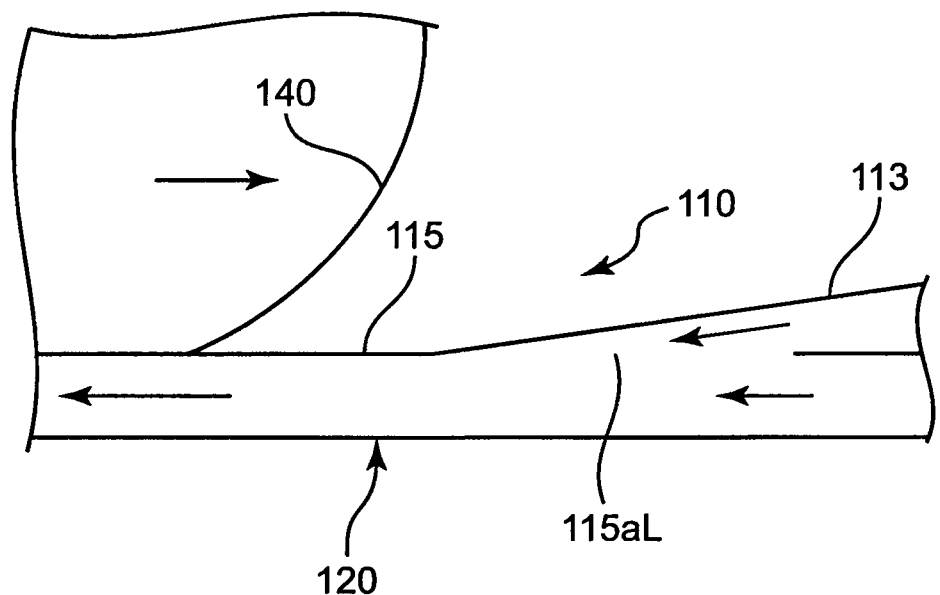
FIG. 11 is a view illustrating an installation modification of the guide of the railcar air-conditioning duct in FIGS. 1 and 2.

The guide 140 is a duct that has a height h2 lower than a height h1 of the main duct 110 in the vehicle height direction 13 and is located in the main duct 110. In the first embodiment, the guide 140 extends continuously from the partition wall 113 of the main duct 110 to the branch duct 130. As illustrated in FIG. 11, the guide 140 may extend not from the partition wall 113, but from the sidewall 115 of the main duct 110 to the branch duct 130.

The guide 140 introduces part of the conditioned air supplied from the air conditioner 180 to the main duct 110 to the branch duct 130 through the opening 131.

More particularly, as illustrated in FIG. 3, the guide 140 includes a bottom plate 116 common to the main duct 110, a ceiling plate 141, and an arc-shaped sidewall 142. In the first embodiment, the sidewall 142 is connected to the partition wall 113. Thus, the guide 140 corresponding to the duct formed by the bottom plate 116, the ceiling plate 141, and the sidewall 142 introduces the conditioned air, which is existed substantially below a vertical cross-section of the main duct 110, namely, a portion corresponding to the height h2 in the conditioned air supplied from the air conditioner 180 to the main duct 110, to the branch duct 130 through the opening 131.

The remaining conditioned air, which is supplied to the main duct 110 from the air conditioner 180 and existed substantially above the vertical cross-section, namely, a portion corresponding to a height (h1-h2), passes above the ceiling plate 141 of the guide 140, advances in the vehicle length direction 11 in the main duct 110, and is supplied to the chamber duct 120 through the outlet 115a in the sidewall 115 of the main duct 110.

In the first embodiment, as illustrated in FIG. 1, the guide 140 includes a first guide 140-1 installed in the first chamber 111 of the main duct 110 and a second guide 140-2 installed in the second chamber 112 of the main duct 110.

In the first embodiment, the height h2 of the guide 140 can take a dimension from 20% to 60% of the height h1 of the main duct 110. Alternatively, the height h2 of the guide 140 may be determined according to a length ratio of the branch duct 130 and the chamber duct 120 in the vehicle length direction 11. Specifically, the height h2 of the guide 140 can be increased with increasing length ratio of the branch duct 130.

The following effects can be obtained by providing the guide 140.

The sidewall 142 of the guide 140 is connected to the partition wall 113 of the main duct 110 such that a conditioned air intake port 143 of the guide 140 has the same or substantially the same width as the main duct 110 in the vehicle width direction 12. Thus, the guide 140 can efficiently introduce the conditioned air supplied from the air conditioner 180 to the main duct 110 into the branch duct 130 (the first branch duct 130-1 and the second branch duct 130-2), and sufficiently secure an amount of conditioned air to be introduced. The amount of conditioned air can easily be controlled by adjusting the height h2 of the guide 140.

As a result, the airflow volume distribution of the conditioned air supplied to the interior 14 can be made more proper, and the temperature distribution in the interior can be made more uniform.

In addition to the dimension in the vehicle width direction 12 of the conditioned air intake port 143 of the guide 140 described above, the height h2 of the guide 140 is kept constant in the vehicle width direction 12, and the bottom plate 116 of the main duct 110 and the ceiling plate 141 of the guide 140 are parallel to each other. Thus, straightening of the conditioned air advancing in the main duct 110 through above the ceiling plate 141 can be achieved. As a result, the amount of conditioned air supplied from the main duct 110 to the chamber duct 120 through the outlet 115a can also sufficiently be secured on an upstream side of the chamber duct 120.

Thus, the airflow volume distribution of the conditioned air supplied from the chamber duct 120 to the interior 14 can be made more proper, and the temperature distribution in the interior can be made more uniform.

The above configuration corresponds to the basic configuration of the air-conditioning duct 101. In the first embodiment, the guide 140 may further include a wind direction plate 150, and the chamber duct 120 may further include a partition plate 160. The wind direction plate 150 and the partition plate 160 will be further described below with reference to FIGS. 2 and 3.

Firstly, the wind direction plate 150 will be described.

The wind direction plate 150 is a plate that is located between the guide 140 (more specifically, the sidewall 142 of the guide section 140) and the air conditioner 180 in the vehicle length direction 11 and disposed separately from the sidewall 142 of the guide 140, and is a member that is vertically provided on the bottom plate 116 and connected to the ceiling plate 141. At least one first wind direction plate 150-1 can be provided in the first guide 140-1, and at least one second wind direction plate 150-2 can be provided in the second guide 140-2. FIG. 2 illustrates the case where one wind direction plate 150 is provided in each of the first guide 140-1 and the second guide 140-2.

The wind direction plate 150 is a member that guides a flow of the conditioned air guided to the branch duct 130 in the guide 140. That is, in the case where the wind direction plate 150 is not provided, the amount of conditioned air flowing on the sidewall 142 side is larger than that on an arc center side of the sidewall 142 in the guide 140. As a result, the amount of conditioned air supplied from the branch duct 130 to the interior 14 tends to become larger on the window side than on the central side of the interior 14 in the vehicle width direction 12. By providing the wind direction plate 150, the wind direction of the conditioned air guided to the branch duct 130 is adjusted to equalize the airflow volume in the vehicle width direction 12 in the branch duct 130. As a result, the amount of conditioned air supplied from the branch duct 130 to the interior 14 can be equalized on the central side and the window side of the interior 14 in the vehicle width direction 12.

By way of example, one end of the wind direction plates 150 is disposed at a position where a width w1 (FIG. 2) in the vehicle width direction 12 of the conditioned air intake port 143 of the guide 140 is equally or approximately equally divided according to the number of installed wind direction plates 150. For example, in the case where two wind direction plates 150 are disposed, one end of each wind direction plate 150 is installed so as to equally divide the width w1 into three.

The wind direction plate 150 includes an extension unit 151 in which the other end of the extension unit 151 extends into the branch duct 130 through the opening 131. The extension unit 151 is disposed such that a width w2 (FIG. 2) in the vehicle width direction 12 of the branch duct 130 is equally or approximately equally divided according to the number of installed wind direction plates 150. For example, in the case where two wind direction plates 150 are disposed, each extended unit 151 is disposed so as to equally divide the width w2 into three.

Figure 4:
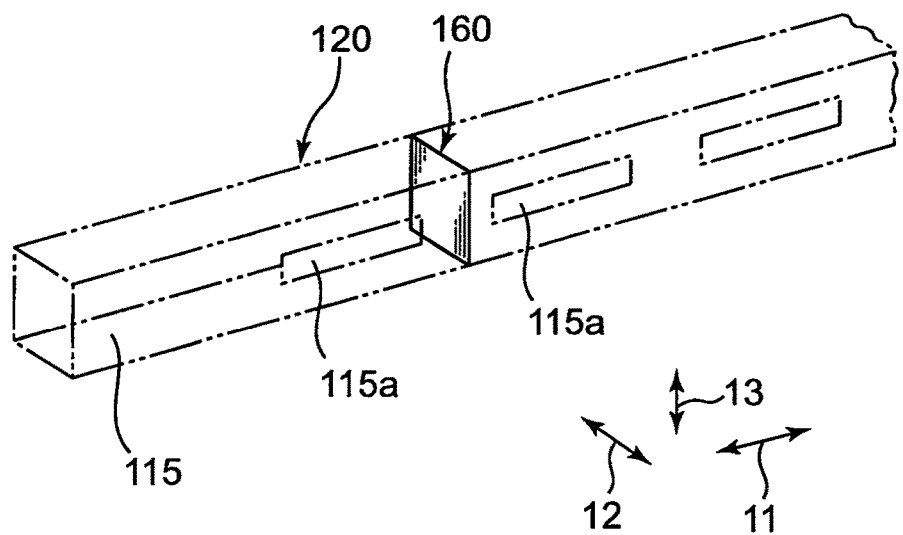
FIG. 4 is a perspective view illustrating a modification of the railcar air-conditioning duct in FIG. 1, and is a perspective view illustrating a mode in which a chamber duct includes a partition plate.

The partition plate 160 will be further described below with reference to FIG. 4.

The partition plate 160 is a member that extends in the vehicle width direction 12 in the chamber duct 120 (the first chamber duct 120-1 and the second chamber duct 120-2), and at least one partition plate 160 is provided in the vehicle length direction 11 in each chamber duct 120. FIG. 2 illustrates the case where one partition plate 160 is provided for each chamber duct 120. The partition plate 160 provided in the first chamber duct 120-1 may be referred to as a first partition plate 160-1, and the partition plate 160 provided in the second chamber duct 120-2 may be referred to as a second partition plate 160-2.

The partition plate 160 serves as a baffle plate in the chamber duct 120. Thus, the partition plate 160 prevents the conditioned air supplied from the main duct 110 to the upstream side of the chamber duct 120 through the outlet 115a from flowing directly in the vehicle length direction 11 within the chamber duct 120 to the vehicle end 15 of the railcar 10.

By providing the partition plate 160 in this way, the conditioned air can sufficiently be supplied from the chamber duct 120 to the interior 14 on the upstream side of the chamber duct 120, namely, in the region close to the branch duct 130 in the vehicle length direction 11. As a result, the temperature in the interior 14 on the upstream side of the chamber duct 120 can be equalized to the temperature in other places in the interior 14.

For the installation purpose of the partition plate 160, in the case where only one partition plate 160 is provided in one chamber duct 120, the partition plate 160 is disposed in the vicinity of an end on the upstream side of the chamber duct 120 as illustrated in FIG. 2. That is, the installation position of the partition plate 160 corresponds to a central portion between the center of the railcar 10 and the end on the upstream side of the chamber duct 120 in the vehicle length direction 11, more specifically corresponds to a portion slightly closer to the end on the upstream side than a midpoint between the center of the railcar 10 and the end on the upstream side of the chamber duct 120.

On the other hand, in the case where a plurality of partition plates 160 are provided in each chamber duct 120, the partition plates 160 can be disposed according to one or a plurality of outlets 115a of the chamber duct 120.

The air flow noise suppressing member 190 will be described below with reference to FIGS. 12A, 12B, and 12C. In FIGS. 12A, 12B, and 12C, an arrow "A" indicates the flow of the conditioned air.

In the first embodiment, as illustrated in FIG. 3, the sidewall 142 of the guide 140 is provided perpendicular to the bottom plate 116. On the other hand, as described above, part of the conditioned air passes above the ceiling plate 141 of the guide 140 and advances into the main duct 110. However, an air flow is disturbed by a step formed by the sidewall 142, and an air flow noise may be generated.

In order to suppress the generation of the air flow noise, as illustrated in FIG. 12A, a first air flow noise suppressing member 191 that is inclined downward from the upstream toward the downstream of the conditioned air can be provided within the main duct 110. The first air flow noise suppressing member 191 is located between the ceiling plate 141 of the guide 140 and the bottom plate 116, and an inclination angle θ with respect to the bottom plate 116 ranges from 8 degrees to 15 degrees and takes, for example, 12 degrees.

Similarly to the case of the main duct 110, even when the conditioned air enters into the branch duct 130 by the guide 140, the air flow is disturbed by a step, and an air flow noise may be generated. As illustrated in FIGS. 12B and 12C, a second air flow noise suppressing member 192 extending from the opening 131 of the branch duct 130 toward the ceiling 133 of the branch duct 130 can be disposed within the branch duct 130 in order to suppress the generation of the air flow noise. At this point, the second air flow noise suppressing member 192 may be connected to a sidewall 134 of the branch duct 130 instead of the ceiling 133. A third air flow noise suppressing member 193 extending from the second air flow noise suppressing member 192 to the ceiling 133 of the branch duct 130 can be provided within the branch duct 130 in a direction in which the conditioned air flows within the branch duct 130.

By providing the air flow noise suppressing member 190 (the first air flow noise suppressing member 191, the second air flow noise suppressing member 192, the third air flow noise suppressing member 193) described above, the steps are reduced with respect to the flow of the conditioned air to suppress the disturbance of air flow. As a result, the generation of the air flow noise can be suppressed.

An air conditioning operation by the air-conditioning duct 101 of the first embodiment having the above configuration will be described below.

The first air conditioner 180-1 installed at the one end 15-1 in the vehicle length direction and the second air conditioner 180-2 installed at the other end 15-2 in the vehicle length direction suck air in the interior 14 from the suction port 181 provided in each of the first air conditioner 180-1 and the second air conditioner 180-2, adjust the sucked air to a set temperature as the conditioned air, and supply the conditioned air to the main duct 110. That is, the conditioned air is supplied from an opening of the first air conditioner 180-1 to the first chamber 111 of the main duct 110, and supplied from an opening of the second air conditioner 180-2 to the second chamber 112 of the main duct 110.

Part of the conditioned air supplied to the first chamber 111 is introduced into the branch duct 130-1 by the first guide 140-1, and supplied to the interior 14 through the diffuser 171. The remaining conditioned air passes above the ceiling plate 141 of the first guide 140-1, and advances in the first chamber 111 while being guided by the partition wall 113. At this point, the conditioned air is supplied to the first chamber duct 120-1 through each outlet 115a in the sidewall 115 of the first chamber 111, and supplied to the interior 14 through the diffuser 171 of the first chamber duct 120-1. The conditioned air having advanced to the end of the partition wall 113 in the first chamber 111 enters the first chamber duct 120-1 through the outlet 115aL, and joins the conditioned air that already entered the first chamber duct 120-1. The joined conditioned air advances into the first chamber duct 120-1 to the other end 15-2 in the vehicle length direction that is the second air conditioner 180-2 side, and is supplied to the interior 14 through the diffuser 171.

The conditioned air supplied to the second chamber 112 is the same as the case of the first chamber 111 described above, so that the description thereof will be omitted.

As described above, according to the air-conditioning duct 101 of the first embodiment, the conditioned air is equally or substantially equally supplied from the first chamber duct 120-1 and the second chamber duct 120-2 to the interior 14. By providing the guide 140, the conditioned air is also equally or substantially equally supplied from the first branch duct 130-1 disposed at the one end 15-1 in the vehicle length direction and the second branch duct 130-2 disposed at the other end 15-2 in the vehicle length direction to the interior 14. Thus, the amount of supplied conditioned air does not greatly deviate within the interior 14, and the temperature in the interior 14 can be made uniform. By providing the partition plate 160 in each chamber duct 120, the conditioned air is equally or substantially equally supplied from any place of each chamber duct 120 to the interior 14 in the vehicle length direction 11.

In the first embodiment, the air conditioners 180 are disposed at the vehicle ends 15 of the railcar 10, but the installation position of the air conditioner 180 is not limited to the vehicle end 15.

A modification of the air-conditioning duct 101 of the first embodiment will be sequentially described below.

Second Embodiment

An air-conditioning duct 102 according to a second embodiment will be described with reference to FIG. 7A mainly. Hereinafter, a main difference in configuration will be described in comparison with the air-conditioning duct 101 of the first embodiment, and description of the same or similar configuration will be omitted.

In the air-conditioning duct 101 of the first embodiment, the air conditioner 180 is installed at each of the vehicle ends 15. On the other hand, in the air-conditioning duct 102 of the second embodiment, one air conditioner 180 is disposed in the central portion in the vehicle length direction 11 of the railcar 10.

Consequently, the main duct 110 does not include the partition wall 113, but includes the first chamber 111 extending to the one end 15-1 side (first end side) in the vehicle length direction of the railcar 10, and the second chamber 112 extending to the other end 15-2 side (second end side) in the vehicle length direction.

On the one end side 12a in the vehicle width direction, the first chamber duct 120-1 is disposed at the one end 15-1 in the vehicle length direction, and the first branch duct 130-1 extending to the other end 15-2 in the vehicle length direction is disposed adjacent to the first chamber duct 120-1. On the other end side 12b in the vehicle width direction, the second chamber duct 120-2 is disposed at the other end 15-2 in the vehicle length direction, and the second branch duct 130-2 extending to the one end 15-1 in the vehicle length direction is disposed adjacent to the second chamber duct 120-2.

Figure 7A:
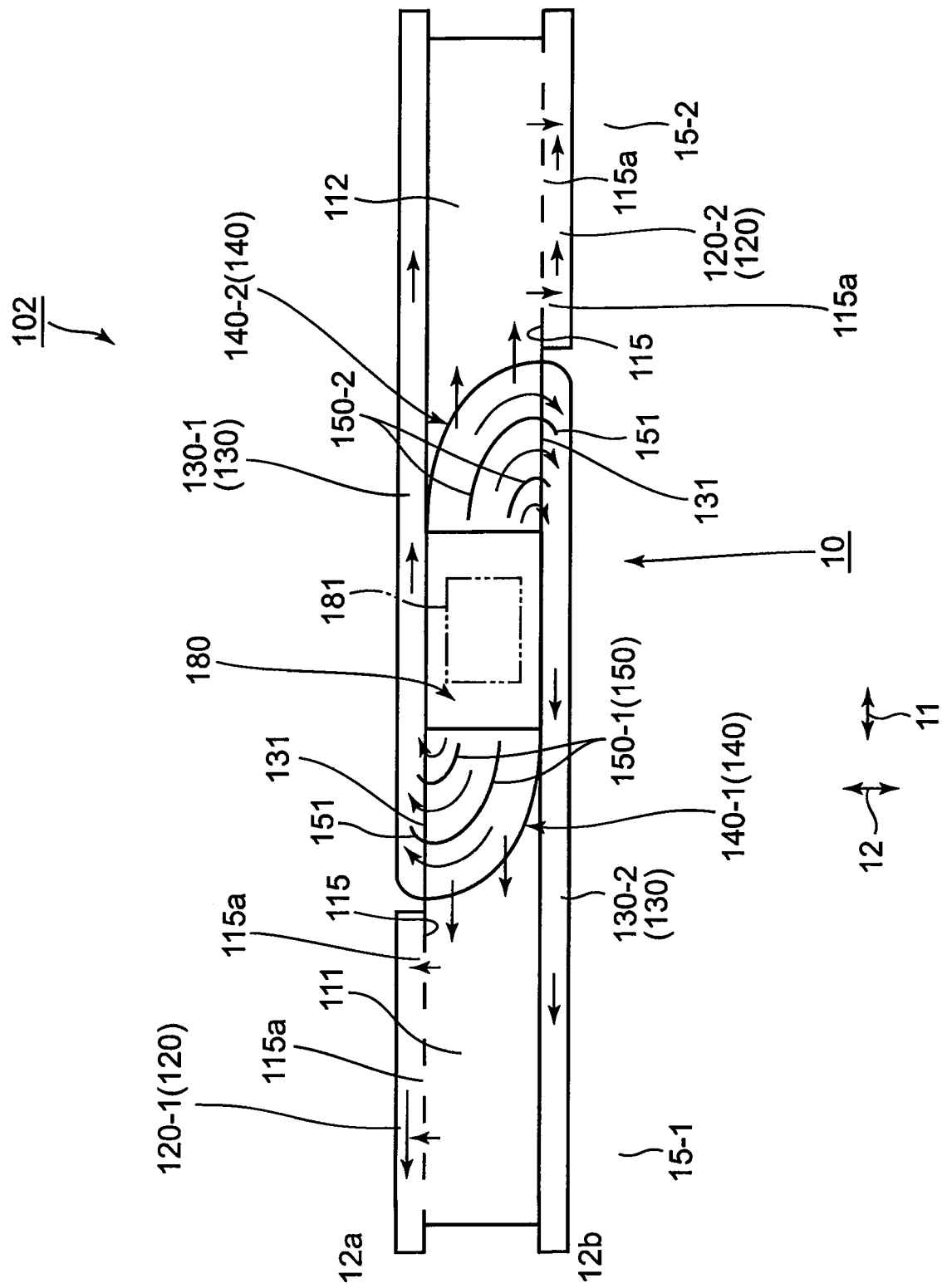
FIG. 7A is a view illustrating a schematic configuration of a railcar air-conditioning duct according to a second embodiment.

In the second embodiment, as illustrated in FIG. 7A, the partition plate 160 is not provided in each chamber duct 120. However, as illustrated in FIG. 2, the partition plate 160 may be provided in each chamber duct 120.

The first guide 140-1 is provided for the first branch duct 130-1, and the second guide 140-2 is provided for the second branch duct 130-2. FIG. 7A illustrates the case where two wind direction plates 150 are provided in the guide 140 by way of example. The wind direction plate 150 is not necessarily provided.

An air conditioning operation by the air-conditioning duct 102 of the second embodiment having the above configuration will be described below.

The one air conditioner 180 disposed in the central portion of the vehicle supplies the conditioned air to the first chamber 111 and the second chamber 112. Part of the conditioned air supplied to the first chamber 111 is introduced into the first branch duct 130-1 by the first guide 140-1, and flows to the other end 15-2 in the vehicle length direction along the vehicle length direction 11. At this point, the conditioned air is supplied to the interior 14 through the diffuser 171 of the first branch duct 130-1.

The length of each branch duct 130 in the vehicle length direction 11 is larger than that of the first embodiment, but as described above, the sufficient amount of conditioned air can be introduced to the branch ducts 130 by properly adjusting the height h2 of the guide 140.

The remaining conditioned air supplied to the first chamber 111 passes above the ceiling plate 141 of the first guide 140-1, and advances toward the one end 15-1 in the vehicle length direction in the first chamber 111 along the vehicle length direction 11. At this point, the conditioned air is supplied to the first chamber duct 120-1 through each outlet 115a in the sidewall 115 of the first chamber 111, and supplied to the interior 14 through the diffuser 171 of the first chamber duct 120-1.

The conditioned air supplied to the second chamber 112 is the same as the case of the first chamber 111 described above, so that the description thereof will be omitted.

The conditioned air is also equally or substantially equally supplied from the first chamber duct 120-1, the second chamber duct 120-2, the first branch duct 130-1, and the second branch duct 130-2 to the interior 14 through the air-conditioning duct 102 of the second embodiment. Thus, in the air-conditioning duct 102 of the second embodiment, the amount of supplied conditioned air does not greatly deviate within the interior 14, and the temperature in the interior 14 can be made uniform.

The following modifications of the second embodiment can also be made.

That is, in the second embodiment, one air conditioning device 180 is disposed in the central portion of the vehicle as illustrated in FIG. 7A. Alternatively, at least two air conditioners 180-1, 180-2 may be disposed adjacent to each other in the vehicle length direction 11 in the central portion of the vehicle such that the conditioned air is supplied from each air conditioner 180 to the first chamber 111 and the second chamber 112. In the disposition of the air conditioner 180 in FIG. 7A, the two air conditioners 180 can also be disposed in the vehicle width direction 12.

Figure 7B:
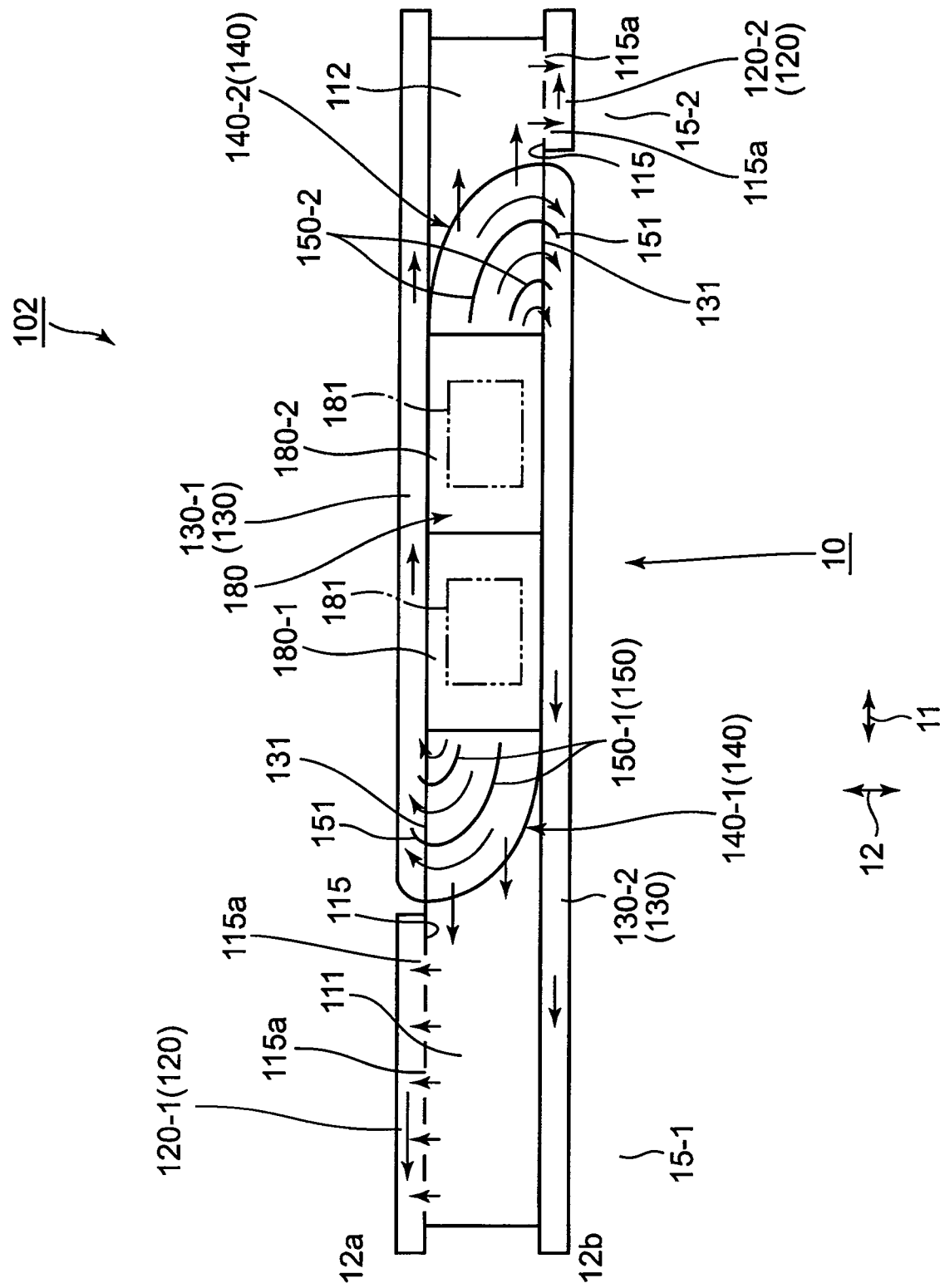
FIG. 7B is a view illustrating a modification of the railcar air-conditioning duct in FIG. 7A.

In the second embodiment, the first chamber 111 and the second chamber 112 are identical to each other in the length in the vehicle length direction 11. Alternatively, as illustrated in FIG. 7B, the first chamber 111 and the second chamber 112 may be different from each other in the length in the vehicle length direction 11. Although FIG. 7B illustrates the case where two air conditioners 180 are disposed while the first chamber 111 is longer than the second chamber 112, the second chamber 112 may be longer than the first chamber 111.

In the case where the first chamber 111 and the second chamber 112 are different from each other in the length in the vehicle length direction 11, for example, the airflow volume adjustment between the first chamber duct 120-1 and the first branch duct 130-1 can be performed by changing the height h2 of the guide 140 according to a length ratio in the vehicle length direction 11 of the first chamber duct 120-1 and the first branch duct 130-1. Specifically, for example, the height h2 of the guide 140 can be increased with increasing length ratio of the branch duct 130-1.

Conditioned air supply performance of the air conditioners 180-1, 180-2 can be adjusted according to the length ratio in the vehicle length direction 11 of the first chamber 111 and the second chamber 112. Specifically, for example, the conditioned air supply performance of the air conditioner 180-1 can be increased with increasing length ratio of the first chamber 111.

Although FIG. 7B illustrates the case where two air conditioners 180 are provided, there is no particular limitation on the number of air conditioners 180. In the case where one air conditioner 180 is provided, a ratio of the amount of conditioned air distributed to the first chamber 111 and the second chamber 112 can be changed according to the length ratio in the vehicle length direction 11 of the first chamber 111 and the second chamber 112. Specifically, for example, as the ratio of the length of the first chamber 111 increases, the amount of conditioned air distributed to the first chamber 111 can be increased with increasing length ratio of the first chamber 111.

Third Embodiment

An air-conditioning duct 103 according to a third embodiment will be described with reference to FIG. 8A mainly. Hereinafter, a main difference in configuration will be described in comparison with the air-conditioning duct 101 of the first embodiment, and description of the same or similar configuration will be omitted.

In the air-conditioning duct 103 of the third embodiment, similarly to the second embodiment, only one air conditioner 180 is disposed in the central portion in the vehicle length direction 11 of the railcar 10.

Consequently, the main duct 110 does not include the partition wall 113, and includes only the second chamber 112 extending to the other end 15-2 (second end side) in the vehicle length direction in the third embodiment.

On the one end side 12a in the vehicle width direction, a first chamber duct 120-1-2 is disposed at the other end 15-2 in the vehicle length direction, and a first branch duct 130-1-2 extending to the one end 15-1 in the vehicle length direction is disposed adjacent to the first chamber duct 120-1-2. On the other end side 12b in the vehicle width direction, a second chamber duct 120-2-2 is disposed at the other end 15-2 in the vehicle length direction, and a second branch duct 130-2-2 extending to the one end 15-1 in the vehicle length direction is disposed adjacent to the second chamber duct 120-2-2.

Figure 8A:
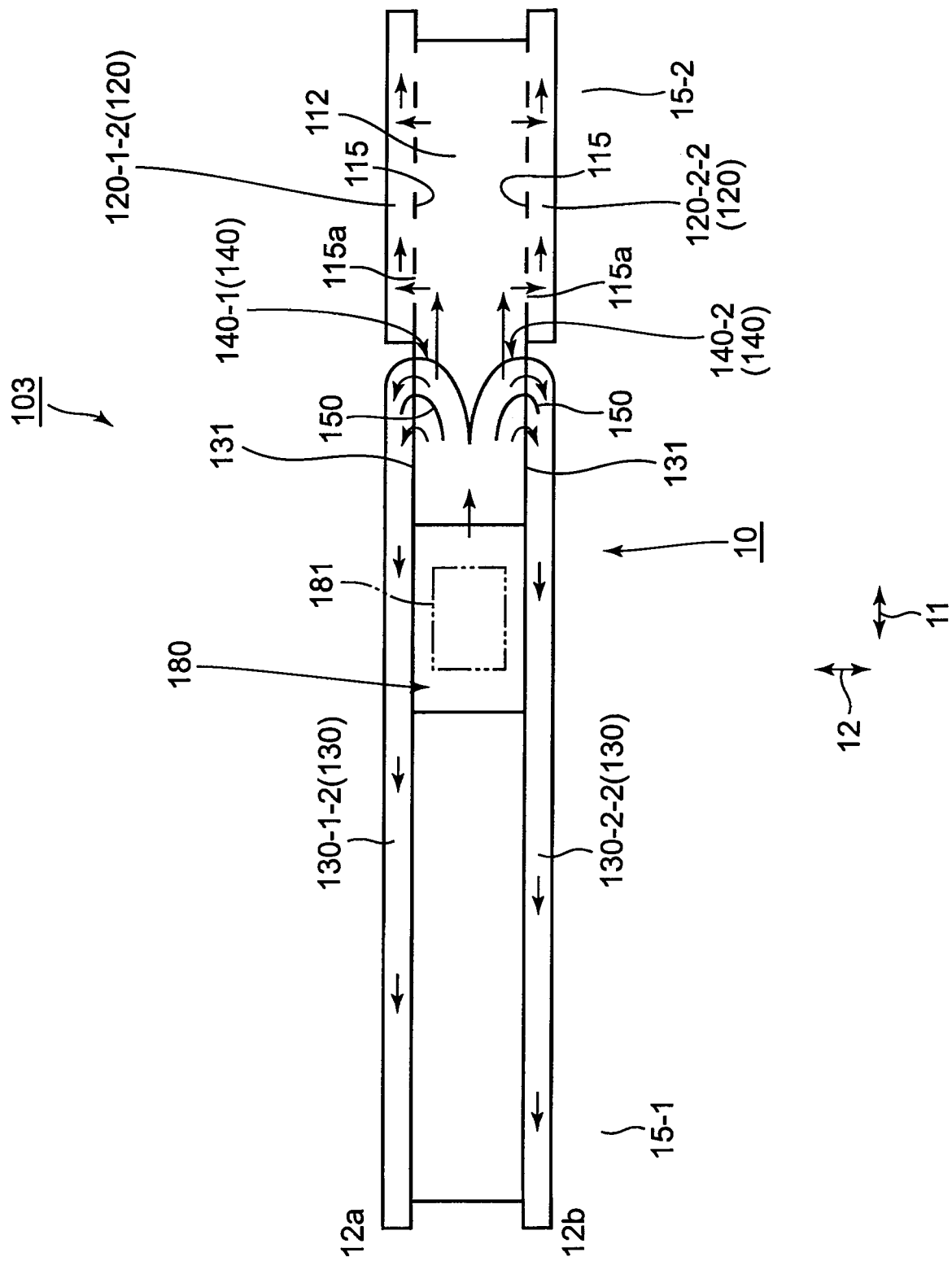
FIG. 8A is a view illustrating a schematic configuration of a railcar air-conditioning duct according to a third embodiment.

In the third embodiment, similarly to the second embodiment, the partition plate 160 is not provided in each chamber duct 120 as illustrated in FIG. 8A. However, as illustrated in FIG. 2, the partition plate 160 may be provided in each chamber duct 120.

The first guide 140-1 is provided for the first branch duct 130-1-2, and the second guide 140-2 is provided for the second branch duct 130-2-2. In the third embodiment, the sidewalls 142 of the first guide 140-1 and the second guide 140-2 extend onto both the sides in the vehicle width direction 12 with the central portion in the vehicle width direction 12 of the first chamber 111 of the main duct 110 as a starting point. Each guide 140 includes the wind direction plate 150, and each one wind direction plate 150 is provided as an example in the third embodiment. The wind direction plate 150 is not necessarily provided.

An air conditioning operation by the air-conditioning duct 103 of the third embodiment having the above configuration will be described below.

The one air conditioner 180 disposed in the central portion of the vehicle supplies the conditioned air to the second chamber 112. Part of the conditioned air supplied to the second chamber 112 is equally divided and introduced into the first branch duct 130-1-2 and the second branch duct 130-2-2 by the first guide 140-1 and the second guide 140-2. Then, the conditioned air flows to the one end 15-1 in the vehicle length direction along the vehicle length direction 11 within the first branch duct 130-1-2 and the second branch duct 130-2-2. At this point, the conditioned air is supplied to the interior 14 through each diffuser 171 (FIG. 6) of each branch duct 130.

The remaining conditioned air supplied to the second chamber 112 passes above the ceiling plate 141 of each guide 140, and flows to the other end 15-2 in the vehicle length direction along the vehicle length direction 11 within the second chamber 112. At this point, the conditioned air is supplied into the first chamber duct 120-1-2 and the second chamber duct 120-2-2 through each outlet 115a in the sidewall 115 of the second chamber 112, and supplied to the interior 14 through each diffuser 171 of each chamber duct 120.

The conditioned air is also equally or substantially equally supplied from the first chamber duct 120-1-2, the second chamber duct 120-2-2, the first branch duct 130-1-2, and the second branch duct 130-2-2 to the interior 14 through the air-conditioning duct 103 of the third embodiment. Thus, in the air-conditioning duct 103 of the third embodiment, the amount of supplied conditioned air does not greatly deviate within the interior 14, and the temperature in the interior 14 can be made uniform.

In the third embodiment, the main duct 110 (second chamber 112) and the chamber duct 120 are disposed on the other end 15-2 in the vehicle length direction. Alternatively, the main duct 110 (the first chamber 111) and the chamber duct 120 may be disposed on the one end 15-1 side in the vehicle length direction while inverted in the vehicle length direction 11, and the branch duct 130 may be disposed so as to extend toward the other end 15-2 in the vehicle length direction.

Figure 8B:
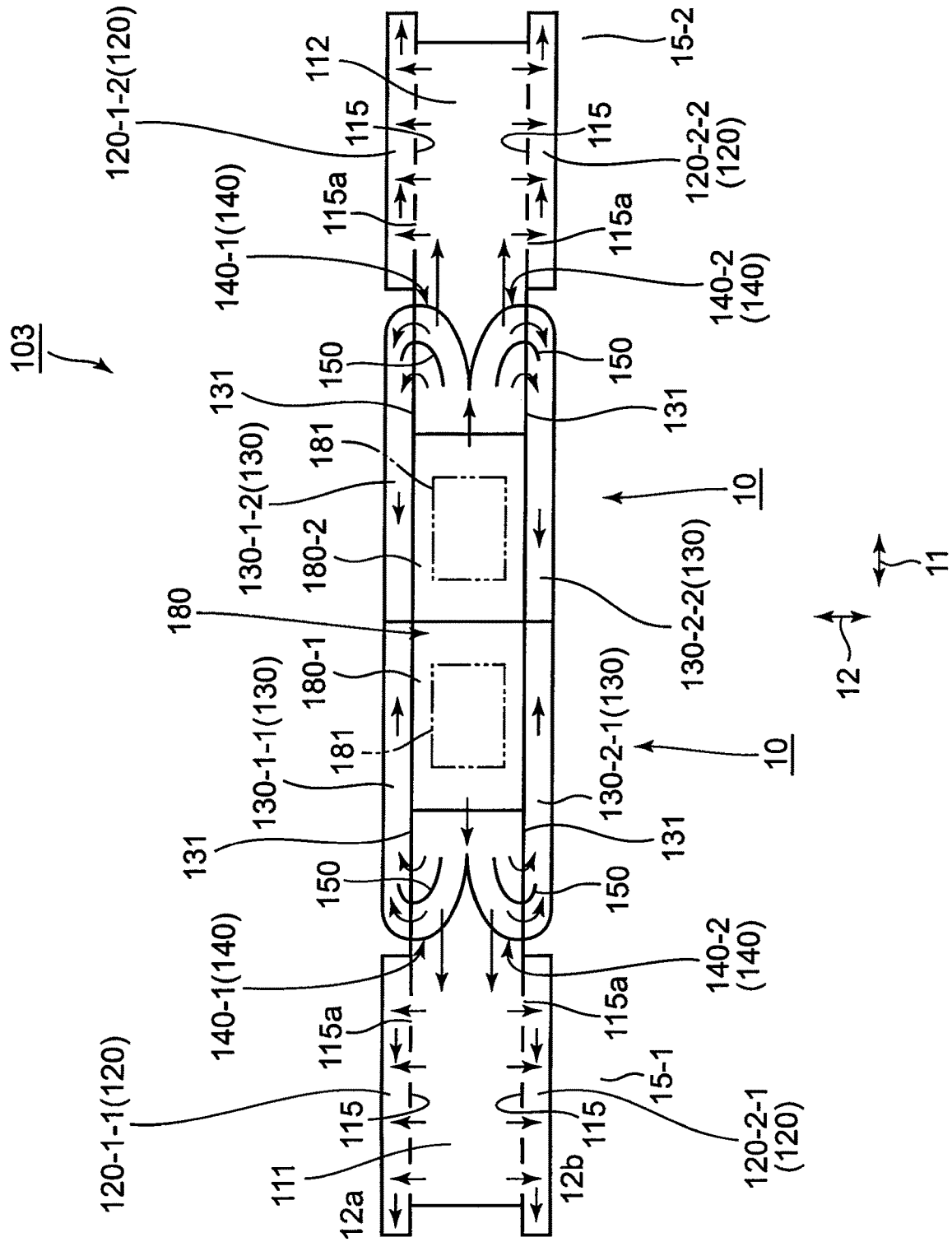
FIG. 8B is a view illustrating a modification of the railcar air-conditioning duct in FIG. 8A.

As a modification of the third embodiment, two air conditioners 180-1, 180-2 may be disposed adjacent to each other in the vehicle length direction 11 in the central portion of the vehicle, and the air conditioners 180-1, 180-2 may have the identical configuration back and forth in the vehicle length direction 11, as illustrated in FIG. 8B.

In the configuration of FIG. 8B, the first chamber 111 and the second chamber 112 may be different from each other in the length in the vehicle length direction 11. In the case where the first chamber 111 and the second chamber 112 are different from each other in the length in the vehicle length direction 11, for example, on each of the first chamber 111 side and the second chamber 112 side, the airflow volume adjustment between the first chamber duct 120-1-1 and the first branch duct 130-1-1 can be performed by changing the height h2 of the guide 140-1 according to the length ratio in the vehicle length direction 11 of the first chamber duct 120-1-1 and the first branch duct 130-1-1. Specifically, for example, the height h2 of the guide 140-1 can be increased with increasing length ratio of the branch duct 130-1-1.

Conditioned air supply performance of the air conditioners 180-1, 180-2 can be adjusted according to the length ratio in the vehicle length direction 11 of the first chamber 111 and the second chamber 112. Specifically, for example, the conditioned air supply performance of the air conditioner 180-1 can be increased with increasing length ratio of the first chamber 111.

Fourth Embodiment

An air-conditioning duct 104 according to a fourth embodiment will be described with reference to FIG. 9 mainly. Hereinafter, a main difference in configuration will be described in comparison with the air-conditioning duct 101 of the first embodiment, and description of the same or similar configuration will be omitted. The fourth embodiment corresponds to a modification of the third embodiment, and the air conditioner 180 of the third embodiment is different from the air conditioner 180 of the fourth embodiment in the disposition.

As compared with the first embodiment in which the air conditioners 180 are installed at both the vehicle ends 15, in the air-conditioning duct 104 of the fourth embodiment, the air conditioner 180 is disposed only at one vehicle end 15. FIG. 9 illustrates the configuration in which the air conditioner 180 is disposed only at the one end 15-1 in the vehicle length direction on the first end side.

Consequently, the main duct 110 does not include the partition wall 113, and includes only the first chamber 111 extending to the other end 15-2 in the vehicle length direction on the second end side of the railcar 10.

On the one end side 12a in the vehicle width direction, the first branch duct 130-1 is disposed at the one end 15-1 in the vehicle length direction, and the first chamber duct 120-1 extending to the other end 15-2 in the vehicle length direction is disposed adjacent to the first branch duct 130-1. On the other end side 12b in the vehicle width direction, the second branch duct 130-2 is disposed at the one end 15-1 in the vehicle length direction, and the second chamber duct 120-2 extending to the other end 15-2 in the vehicle length direction is disposed adjacent to the second branch duct 130-2.

Figure 9:
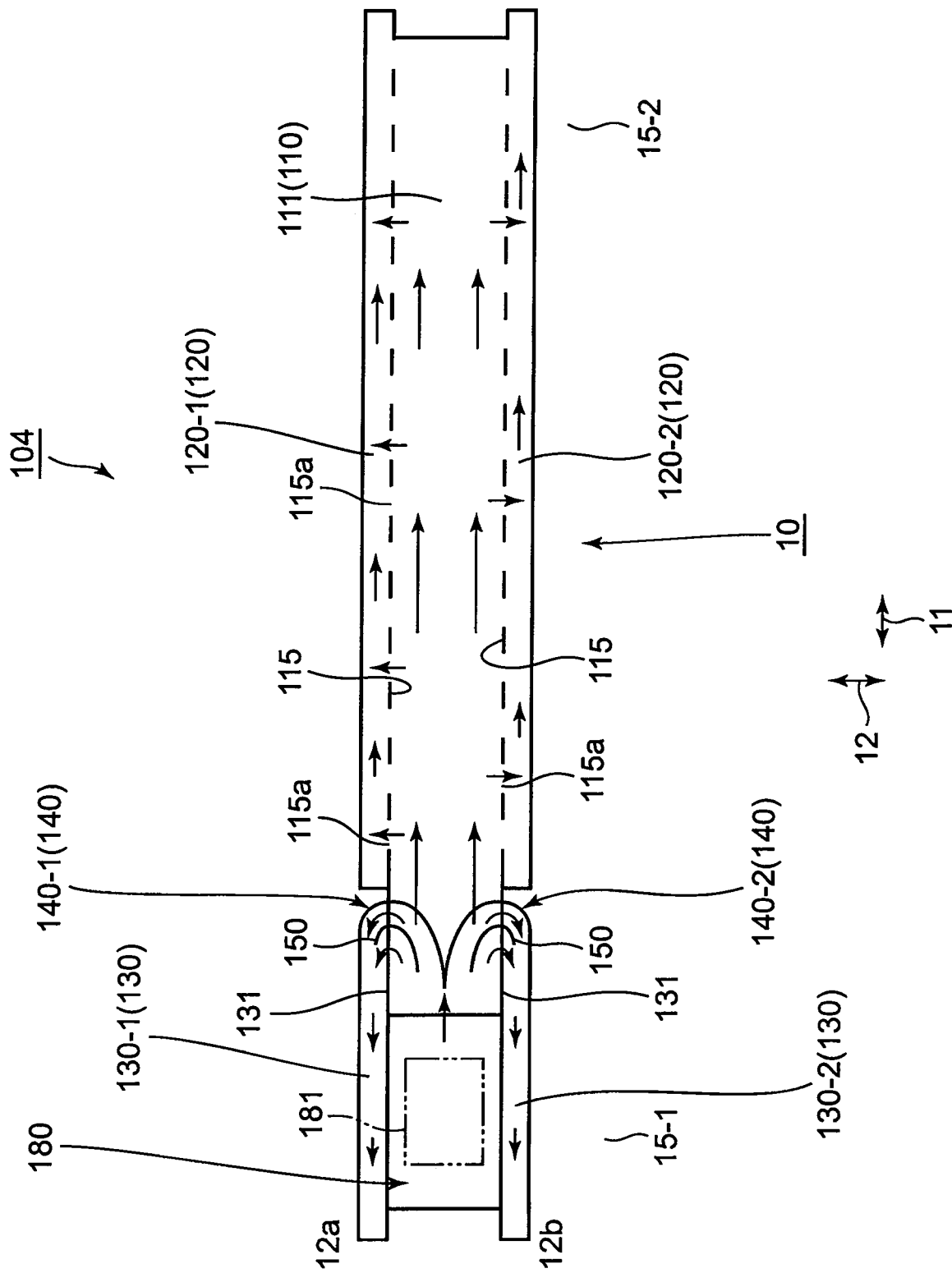
FIG. 9 is a view illustrating a schematic configuration of a railcar air-conditioning duct according to a fourth embodiment.

Although not illustrated in FIG. 9, the partition plate 160 may be provided in each chamber duct 120.

The first guide 140-1 is provided for the first branch duct 130-1, and the second guide 140-2 is provided for the second branch duct 130-2. In the fourth embodiment, similarly to the third embodiment, the sidewalls 142 of the first guide 140-1 and the second guide 140-2 extend to both the sides in the vehicle width direction 12 with the central portion in the vehicle width direction 12 of the first chamber 111 of the main duct 110 as a starting point. Each guide 140 includes the wind direction plate 150, and each one wind direction plate 150 is provided as an example in the fourth embodiment. The wind direction plate 150 is not necessarily provided.

An air conditioning operation by the air-conditioning duct 104 of the fourth embodiment having the above configuration will be described below.

One air conditioner 180 supplies the conditioned air to the main duct 110 (first chamber 111). Part of the conditioned air supplied to the main duct 110 is equally divided and introduced into the first branch duct 130-1 and the second branch duct 130-2 by the first guide 140-1 and the second guide 140-2. The introduced conditioned air in each branch duct 130 is supplied to the interior 14 at the one end 15-1 in the vehicle length direction on the first end side through each diffuser 171 of each branch duct 130.

The remaining conditioned air supplied to the main duct 110 passes above the ceiling plate 141 of each guide 140, and flows to the other end 15-2 in the vehicle length direction on the second end side along the vehicle length direction 11 within the main duct 110. At this point, the conditioned air is supplied into the first chamber duct 120-1 and the second duct chamber 120-2 through each outlet 115a in the sidewall 115 of the main duct 110, and supplied to the interior 14 through each diffuser 171 of each chamber duct 120.

The conditioned air is also equally or substantially equally supplied from the first chamber duct 120-1, the second chamber duct 120-2, the first branch duct 130-1, and the second branch duct 130-2 to the interior 14 through the air-conditioning duct 104 of the fourth embodiment. Thus, in the air-conditioning duct 104 of the fourth embodiment, the amount of supplied conditioned air does not greatly deviate within the interior 14, and the temperature in the interior 14 can be made uniform.

Fifth Embodiment

Figure 10:
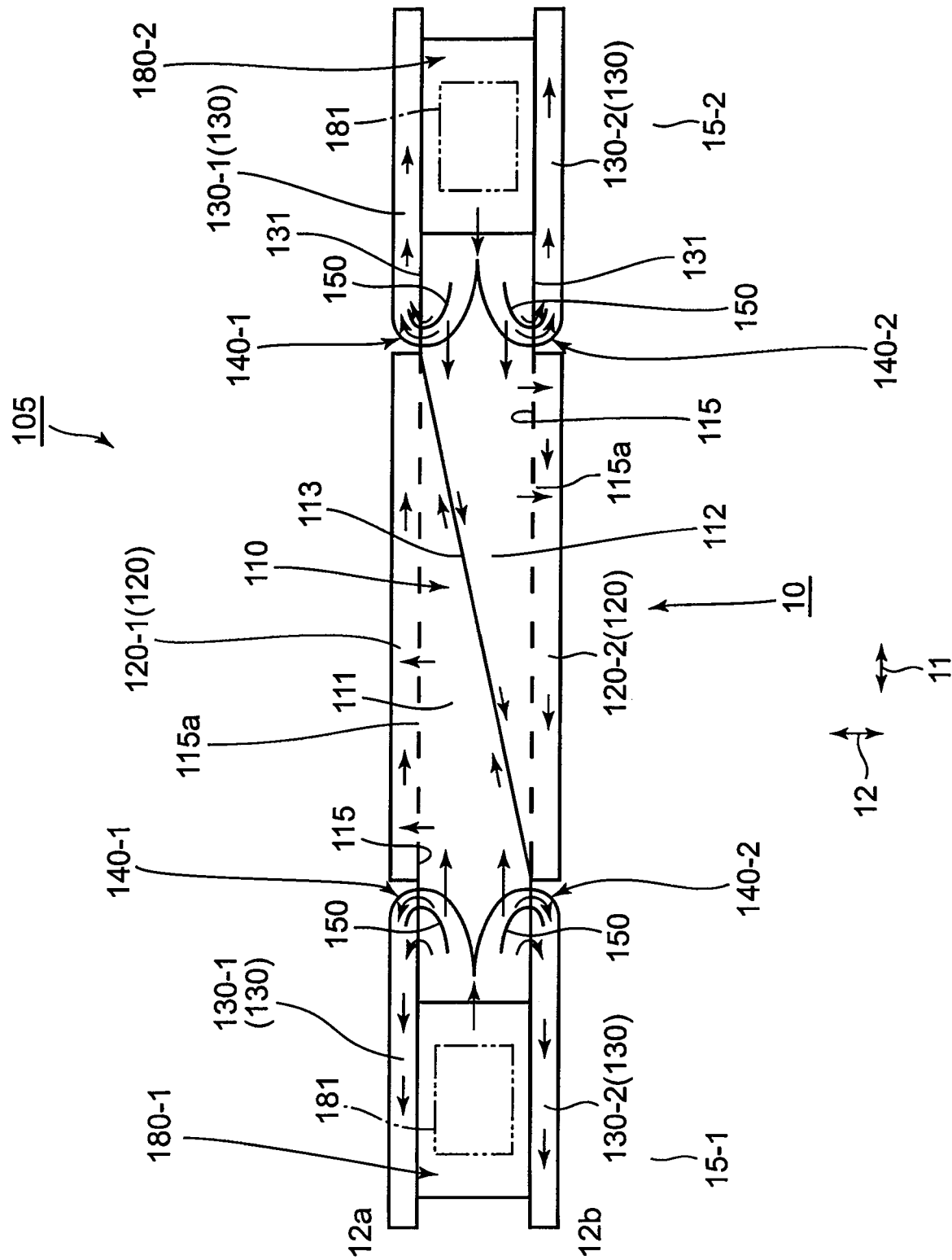
FIG. 10 is a view illustrating a schematic configuration of a railcar air-conditioning duct according to a fifth embodiment.

An air-conditioning duct 105 according to a fifth embodiment will be described with reference to FIG. 10 mainly. Hereinafter, a main difference in configuration will be described in comparison with the air-conditioning duct 101 of the first embodiment, and description of the same or similar configuration will be omitted.

In the air-conditioning duct 101 of the first embodiment, one branch duct 130 is disposed at each vehicle end 15, and thus is disposed at two positions in total. On the other hand, in the fifth embodiment, two branch ducts 130 are disposed at each vehicle end 15, and thus the branch duct 130 is disposed at four positions in total.

That is, on the one end side 12a in the vehicle width direction, the first branch duct 130-1 is disposed at each of the one end 15-1 in the vehicle length direction and the other end 15-2 in the vehicle length direction, and the first chamber duct 120-1 is disposed in the central portion of the vehicle sandwiched between the two first branch ducts 130-1. On the other end side 12b in the vehicle width direction, the second branch duct 130-2 is disposed at each of the one end 15-1 in the vehicle length direction and the other end 15-2 in the vehicle length direction, and the second chamber duct 120-2 is disposed in the central portion of the vehicle sandwiched between the two second branch ducts 130-2.

The first guide 140-1 is provided for the first branch duct 130-1, and the second guide 140-2 is provided for the second branch duct 130-2. FIG. 10 illustrates the case where one wind direction plate 150 is provided as an example in each guide 140. The wind direction plate 150 is not necessarily provided.

In the air conditioner 180, similarly to the first embodiment, the first air conditioner 180-1 and the second air conditioner 180-2 are disposed at both the vehicle ends 15. The main duct 110 divided into the first chamber 111 and the second chamber 112 by the partition wall 113 is disposed in the central portion of the vehicle.

An air conditioning operation by the air-conditioning duct 105 of the fifth embodiment having the above configuration will be described below.

The conditioned air is supplied from the first air conditioner 180-1 to the first chamber 111 of the main duct 110. At the one end 15-1 in the vehicle length direction, part of the conditioned air supplied to the first chamber 111 is introduced into the first branch duct 130-1 by the first guide 140-1, and similarly introduced into the second branch duct 130-2 by the second guide 140-2. The conditioned air supplied to the first branch duct 130-1 and the second branch duct 130-2 at the one end 15-1 in the vehicle length direction is supplied to the interior 14 through the diffuser 171.

The remaining conditioned air supplied to the first chamber 111 passes above the ceiling plates 141 of the first guide 140-1 and the second guide 140-2 in the vehicle length direction 11, and advances in the first chamber 111 while being guided by the partition wall 113. At this point, the conditioned air is supplied to the first chamber duct 120-1 through each outlet 115a in the sidewall 115 of the first chamber 111, and supplied to the interior 14 through the diffuser 171 of the first chamber duct 120-1.

At the other end 15-2 in the vehicle length direction on the second end side, part of the conditioned air supplied from the second air conditioner 180-2 to the second chamber 112 of the main duct 110 is introduced into the first branch duct 130-1 by the first guide 140-1, and similarly introduced into the second branch duct 130-2 by the second guide 140-2. The conditioned air supplied to the first branch duct 130-1 and the second branch duct 130-2 at the other end 15-2 in the vehicle length direction is supplied to the interior 14 through the diffuser 171.

The remaining conditioned air supplied to the second chamber 112 passes above the ceiling plates 141 of the first guide 140-1 and the second guide 140-2 in the vehicle length direction 11, and advances in the second chamber 112 while being guided by the partition wall 113. At this point, the conditioned air is supplied to the second chamber duct 120-2 through each outlet 115a in the sidewall 115 of the second chamber 112, and supplied to the interior 14 through the diffuser 171 of the second chamber duct 120-2.

The conditioned air is also equally or substantially equally supplied from the first chamber duct 120-1, the second chamber duct 120-2, the first branch duct 130-1, and the second branch duct 130-2 to the interior 14 through the air-conditioning duct 105 of the fifth embodiment. Thus, in the air-conditioning duct 105 of the fifth embodiment, the amount of supplied conditioned air does not greatly deviate within the interior 14, and the temperature in the interior 14 can be made uniform.

In the fifth embodiment, the air conditioner 180 is disposed at the vehicle end 15 of the railcar 10, but the installation position of the air conditioner 180 may not be limited to the vehicle end 15.

The above-described vehicle air-conditioning duct can adopt the following aspects.

In a first aspect, provided is a railcar air-conditioning duct extending in a vehicle length direction in a ceiling portion of a vehicle, and through which conditioned air generated by a first air conditioner disposed at one end in the vehicle length direction and a second air conditioner disposed at the other end in the vehicle length direction is supplied to an interior, the railcar air-conditioning duct including:

a main duct disposed between the first air conditioner and the second air conditioner in the vehicle length direction, and to which the conditioned air is supplied from the first air conditioner and the second air conditioner, the main duct including a partition wall connecting a pair of diagonal positions at both ends of the main duct in the vehicle length direction and dividing the main duct into a first chamber and a second chamber;

a first chamber duct located on one end side in a vehicle width direction to extend to the other end in the vehicle length direction, and to which the conditioned air is supplied from the first chamber;

a second chamber duct located on the other end side in the vehicle width direction to extend to the one end in the vehicle length direction, and to which the conditioned air is supplied from the second chamber;

a first branch duct located on the one end side in the vehicle width direction and located on a first air conditioner side with respect to the first chamber duct in the vehicle length direction, the first branch duct communicating with the first chamber;

a second branch duct located on the other end side in the vehicle width direction and located on a second air conditioner side with respect to the second chamber duct in the vehicle length direction, the second branch duct communicating with the second chamber;

a first guide that is lower than a height of the main duct and extending from the main duct or the partition wall to the first branch duct in the vehicle width direction, and through which part of the conditioned air supplied from the first air conditioner to the first chamber is supplied to the first branch duct; and a second guide that is lower than the height of the main duct and extending from the main duct or the partition wall to the second branch duct in the vehicle width direction, and through which part of the conditioned air supplied from the second air conditioner to the second chamber is supplied to the second branch duct.

In a second aspect, the railcar air-conditioning duct of the first aspect may further include: at least one first wind direction plate located between the first guide and the first air conditioner in the vehicle length direction and disposed separately from the first guide; and at least one second wind direction plate located between the second guide and the second air conditioner in the vehicle length direction and disposed separately from the second guide.

In a third aspect, in the railcar air-conditioning duct of the first aspect or the second aspect, the first chamber duct may include at least one first partition plate extending in the vehicle width direction in the first chamber duct, and the second chamber duct may include at least one second partition plate extending in the vehicle width direction in the second chamber duct.

In a fourth aspect, provided is a railcar air-conditioning duct extending in a vehicle length direction in a ceiling portion of a vehicle, and through which conditioned air generated by an air conditioner is supplied to an interior, the railcar air-conditioning duct including:

a pair of main ducts that is disposed while sandwiching the air conditioner in the vehicle length direction, and to which the conditioned air is supplied from the air conditioner;

a first chamber duct located on one end side in a vehicle width direction and disposed on one end side in the vehicle length direction, and to which the conditioned air is supplied from the main duct;

a second chamber duct located on the other end side in the vehicle width direction and disposed on the other end side in the vehicle length direction, and to which the conditioned air is supplied from the main duct;

a first branch duct located on the one end side in the vehicle width direction to extend to the other end side in the vehicle length direction with respect to the first chamber duct, the first branch duct communicating with the main duct;

a second branch duct located on the other end side in the vehicle width direction to extend to the one end side in the vehicle length direction with respect to the second chamber duct in the vehicle length direction, the second branch duct communicating with the main duct;

a first guide that is lower than a height of the main duct and extending from the main duct to the first branch duct in the vehicle width direction, and through which part of the conditioned air supplied from the air conditioner to the main duct is supplied to the first branch duct; and a second guide that is lower than the height of the main duct and extending from the main duct to the second branch duct in the vehicle width direction, and through which part of the conditioned air supplied from the air conditioner to the main duct is supplied to the second branch duct.

In a fifth aspect, provided is a railcar air-conditioning duct extending in a vehicle length direction in a ceiling portion of a vehicle, and through which conditioned air generated by an air conditioner is supplied to an interior, the railcar air-conditioning duct including:

a main duct to which the conditioned air is supplied;

a first chamber duct located on one end side in a vehicle width direction, and to which the conditioned air is supplied from the main duct;

a second chamber duct located on the other end side in the vehicle width direction, and to which the conditioned air is supplied from the main duct;

a first branch duct located on the one end side in the vehicle width direction and located on an air conditioner side with respect to the first chamber duct in the vehicle length direction, the first branch duct communicating with the main duct;

a second branch duct located on the other end side in the vehicle width direction and located on the air conditioner side with respect to the second chamber duct in the vehicle length direction, the second branch duct communicating with the main duct;

a first guide that is lower than a height of the main duct and extending from a central portion of the main duct to the first branch duct in the vehicle width direction, and through which part of the conditioned air supplied from the air conditioner to the main duct is supplied to the first branch duct; and a second guide that is lower than the height of the main duct and extending from a central portion of the main duct to the second branch duct in the vehicle width direction, and through which part of the conditioned air supplied from the air conditioner to the main duct is supplied to the second branch duct.

In a sixth aspect, in the railcar air-conditioning duct according to the fifth aspect, the air conditioner may include a first air conditioner disposed at the one end in the vehicle length direction and a second air conditioner disposed at the other end in the vehicle length direction, and the main duct may include a partition wall that is disposed between the first air conditioner and the second air conditioner in the vehicle length direction, and connects a set of diagonal positions at both the ends in the vehicle length direction to divide the main duct into a first chamber and a second chamber.

By combining the optional ones of the embodiments as needed, the respective effects in the optional ones can be exerted.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2016-111700 filed on Jun. 3, 2016 including specification, drawings, claims, and summary are incorporated herein by reference in its entirety.

INDUSTRIAL APPLICABILITY

The present invention is applicable to the railcar air-conditioning duct.

DESCRIPTION OF REFERENCE SYMBOLS

10 RAILCAR
11 VEHICLE LENGTH DIRECTION
12 VEHICLE WIDTH DIRECTION
13 VEHICLE HEIGHT DIRECTION
101-105 AIR-CONDITIONING DUCT
110 MAIN DUCT
111 FIRST CHAMBER
112 SECOND CHAMBER
113 PARTITION WALL
120 CHAMBER DUCT
120-1 FIRST CHAMBER DUCT
120-2 SECOND CHAMBER DUCT
130 BRANCH DUCT
130-1 FIRST BRANCH DUCT
130-2 SECOND BRANCH DUCT
140 GUIDE
140-1 FIRST GUIDE
140-2 SECOND GUIDE
150-1 FIRST WIND DIRECTION PLATE
150-2 SECOND WIND DIRECTION PLATE
160 PARTITION PLATE

The invention claimed is:

1. A railcar air-conditioning duct extending in a vehicle length direction in a ceiling portion of a vehicle, and through which conditioned air generated by a first air conditioner disposed at a first end in the vehicle length direction and a second air conditioner disposed at a second end in the vehicle length direction is supplied to an interior, the railcar air-conditioning duct comprising:

a main duct configured to be disposed between the first air conditioner and the second air conditioner in the vehicle length direction, to be supplied the conditioned air from the first air conditioner and the second air conditioner, and to include a partition wall connecting a pair of diagonal positions at both ends of the main duct in the vehicle length direction and dividing the main duct into a first chamber and a second chamber;

a first chamber duct configured to be located on a first end in a vehicle width direction and to extend to the second end in the vehicle length direction, and to be supplied the conditioned air from the first chamber;

a second chamber duct configured to be located on a second end in the vehicle width direction and to extend to the first end in the vehicle length direction, and to be supplied the conditioned air from the second chamber;

a first branch duct configured to be located on the first end in the vehicle width direction, to be located on a first air conditioner side with respect to the first chamber duct in the vehicle length direction, and to communicate with the first chamber;

a second branch duct configured to be located on the second end in the vehicle width direction, to be located on a second air conditioner side with respect to the second chamber duct in the vehicle length direction, and to communicate with the second chamber;

a first guide configured to be located within the main duct with a height less than that of the main duct and to extend from a sidewall of the main duct or the partition wall to the first branch duct in the vehicle width direction, and to supply part of the conditioned air supplied from the first air conditioner to the first chamber into the first branch duct; and a second guide configured to be located within the main duct with a height less than that of the main duct and to extend from a sidewall of the main duct or the partition wall to the second branch duct in the vehicle width direction, and to supply part of the conditioned air supplied from the second air conditioner to the second chamber into the second branch duct.

2. The railcar air-conditioning duct according to claim 1, further comprising:

at least one first wind direction plate configured to be located between the first guide and the first air conditioner in the vehicle length direction and disposed separately from the first guide; and at least one second wind direction plate configured to be located between the second guide and the second air conditioner in the vehicle length direction and disposed separately from the second guide.

3. The railcar air-conditioning duct according to claim 1, wherein the first chamber duct includes at least one first partition plate extending in the vehicle width direction in the first chamber duct, and the second chamber duct includes at least one second partition plate extending in the vehicle width direction in the second chamber duct.

4. The railcar air-conditioning duct according to claim 2, wherein the first chamber duct includes at least one first partition plate extending in the vehicle width direction in the first chamber duct, and the second chamber duct includes at least one second partition plate extending in the vehicle width direction in the second chamber duct.

5. A railcar air-conditioning duct extending in a vehicle length direction in a ceiling portion of a vehicle, and through which conditioned air generated by an air conditioner is supplied to an interior, the railcar air-conditioning duct comprising:

a pair of main ducts configured to be disposed while sandwiching the air conditioner in the vehicle length direction, and to be supplied the conditioned air from the air conditioner;

a first chamber duct configured to be located on a first end in a vehicle width direction and disposed on a first end in the vehicle length direction, and to be supplied the conditioned air from the main duct;

a second chamber duct configured to be located on a second end in the vehicle width direction and disposed on a second end in the vehicle length direction, and to be supplied the conditioned air from the main duct;

a first branch duct configured to be located on the first end in the vehicle width direction and to extend to the second end in the vehicle length direction with respect to the first chamber duct, and to communicate with the main duct;

a second branch duct configured to be located on the second end in the vehicle width direction and to extend to the first end in the vehicle length direction with respect to the second chamber duct, and to communicate with the main duct;

a first guide configured to be located within the main duct with a height less than that of the main duct and to extend from a sidewall of the main duct to the first branch duct in the vehicle width direction, and to be supplied part of the conditioned air from the air conditioner to the main duct into the first branch duct; and a second guide configured to be located within the main duct with a height less than that of the main duct and to extend from a sidewall of the main duct to the second branch duct in the vehicle width direction, and to supply part of the conditioned air supplied from the air conditioner to the main duct into the second branch duct.

6. A railcar air-conditioning duct extending in a vehicle length direction in a ceiling portion of a vehicle, and through which conditioned air generated by an air conditioner is supplied to an interior, the railcar air-conditioning duct comprising:

a main duct configured to be supplied the conditioned air;

a first chamber duct configured to be located on a first end in a vehicle width direction, and to be supplied the conditioned air from the main duct;

a second chamber duct configured to be located on a second end in the vehicle width direction, and to be supplied the conditioned air from the main duct;

a first branch duct configured to be located on the first end in the vehicle width direction and located on an air conditioner side with respect to the first chamber duct in the vehicle length direction, and to communicate with the main duct;

a second branch duct configured to be located on the second end in the vehicle width direction and located on the air conditioner side with respect to the second chamber duct in the vehicle length direction, and to communicate with the main duct;

a first guide configured to be located within the main duct with a height less than that of the main duct and to extend from a central portion of the main duct to the first branch duct in the vehicle width direction, and to supply part of the conditioned air supplied from the air conditioner to the main duct into the first branch duct; and a second guide configured to be located within the main duct with a height less than that of the main duct and to extend from the central portion of the main duct to the second branch duct in the vehicle width direction, and to supply part of the conditioned air supplied from the air conditioner to the main duct into the second branch duct, the first guide and the second guide being connected at the central portion and extending onto both sides in the vehicle width direction with the central portion of the main duct as a starting point.

7. The railcar air-conditioning duct according to claim 6, wherein the air conditioner includes a first air conditioner disposed at a first end in the vehicle length direction and a second air conditioner disposed at a second end in the vehicle length direction, and the main duct includes a partition wall that is disposed between the first air conditioner and the second air conditioner in the vehicle length direction, and connects a set of diagonal positions at both the ends in the vehicle length direction to divide the main duct into a first chamber and a second chamber.

* * * * *